United States Patent [19]
Chen

[11] Patent Number: 5,298,732
[45] Date of Patent: Mar. 29, 1994

[54] AUTOMATIC VISOR FOR CONTINUOUSLY REPOSITIONING A SHADING OBJECT TO SHADE A DESIGNATED LOCATION FROM A DIRECT RADIATION SOURCE

[75] Inventor: Sweetsun Chen, Los Altos Hills, Calif.

[73] Assignee: EMEE, Inc., Mountain View, Calif.

[21] Appl. No.: 19,270

[22] Filed: Feb. 18, 1993

[51] Int. Cl.$^5$ .............................................. G01J 1/20
[52] U.S. Cl. ................................ 250/203.4; 250/206.1; 351/44
[58] Field of Search ............... 250/203.4, 206.1, 206.2, 250/208.4, 201.1, 205, 214 B, 214 D; 359/601–608, 613, 230, 265, 275; 352/44, 45, 177; 296/97.3, 97.8, 97.1, 97.6

[56] References Cited

U.S. PATENT DOCUMENTS

| 3,226,151 | 12/1965 | Reuther . | |
| 3,917,942 | 11/1975 | McCay | 250/203.4 |
| 3,961,181 | 6/1976 | Golden . | |
| 4,018,532 | 4/1977 | Fletcher et al. | 250/203.4 |
| 4,641,922 | 2/1987 | Jacob . | |
| 4,874,195 | 10/1989 | Lu et al. . | |
| 4,874,938 | 10/1989 | Chuang . | |
| 4,892,394 | 1/1990 | Bidabad . | |

FOREIGN PATENT DOCUMENTS

| 2635535 | 3/1977 | Fed. Rep. of Germany . |
| 55-68422 | 5/1980 | Japan . |
| 61-41620 | 2/1986 | Japan . |
| 1-182121 | 7/1989 | Japan . |
| 1-186425 | 7/1989 | Japan . |
| 2090570 | 7/1982 | United Kingdom . |

Primary Examiner—David C. Nelms
Assistant Examiner—Que T. Le
Attorney, Agent, or Firm—Townsend and Townsend Khourie and Crew

[57] ABSTRACT

A two dimensional matrix of liquid crystal cells is laid on the surface of a vehicle's windshield. The sunshade is formed by selectively turning some of the cells to be less transparent. The size of the sunshade is close to the minimum necessary to cast an umbra covering the vehicle occupant's eyes. A three dimensional Cartesian coordinate system is used, in which the z axis is parallel to the direction of travel and perpendicular to the x and y axes. The coordinates of an internal target are stored in the memory and may separately be increased or decreased by pushing some buttons. In a normal mode of operation, the microprocessor continuously repositions the sunshade to shade the target from direct sunlight. The computation is based on the image of the sun captured by a two dimensional CCD, the relative locations of the CCD and the optical center of a lens forming the image on the CCD, and the locations of the target and the windshield surface. In a special mode of operation, the microprocessor continuously repositions the sunshade to a position having the same x,y-coordinates as the target. With this sunshade system, the method comprises the steps of (a) switching the system to the special mode and adjusting the x,y-coordinates of the target until the sunshade is repositioned straight ahead of, and at the same height as, the eyes; and (b) switching the system to the normal mode and adjusting the z-coordinate of the target until the sunshade shades the eyes from direct sunlight. Thus the target is coincident with the eyes, and the system will always reposition the sunshade to shade the eyes from direct sunlight.

25 Claims, 16 Drawing Sheets

Figure 23. Listing of the AutoVisor Procedure.

PROCEDURE AutoVisor;

CONST
    $max_x = 30$;
    $max_y = 12$;
    (* $max_x$ and $max_y$ are the maximum for the $x'$- and $y'$-coordinates in inches of the shading position in the $x',y',z'$-coordinate system. *)

VAR
    $q_u, q_v, d_x, d_y, t, old_x, old_y, new_x, new_y$: REAL;
    (* $q_u$ and $q_v$ are the u- and v-coordinates of the point of incidence.
    \* $d_x$ and $d_y$ are the x- and y-members of a set of direction numbers of the reference line.
    \* $old_x$ and $old_y$ are the old $x'$- and $y'$-coordinates, respectively, of the shading position in the $x',y',z'$-coordinate system, while $new_x$ and $new_y$ are the new coordinates of the shading position in the same coordinate system. *)

BEGIN
    (* Initialize the old coordinates of the shading position. *)
    $old_x := 0$;
    $old_y := 0$;

WHILE operating DO BEGIN
        IF normalMode THEN BEGIN
            (* Get the u,v-coordinates of the point of incidence q. *)
            GetPointOfIncid ($q_u, q_v$);

(* Compute the new $x',y'$-coordinates of the shading position. *)
            $d_x := m_u - q_u$;
            $d_y := q_v - m_v$;
            $t := (M_z + M_y * \tan\lambda) / (m_w + d_y * \tan\lambda)$
            $new_x := M_x - t * d_x$;
            $new_y := (M_y - t * d_y) * \sec\lambda$;
    END ELSE BEGIN
        (* $M_x$-$M_y$ setting mode. *)
        $new_x := M_x$;
        $new_y := M_y * \sec\lambda$;

END;

(* *If the new shading position is out of range, change it to the home position.* *)
IF (new$_x$ > xmax OR new$_x$ < -xmax OR new$_y$ > ymax OR new$_y$ < 0) THEN BEGIN
    new$_x$ := 0;
    new$_y$ := 0;
END;

(* *Move the sunshade if the new coordinates of the shading position are different from the old.* *)
IF (old$_x$ - new$_x$ OR old$_y$ - new$_y$) THEN BEGIN
    MoveVisor(old$_x$, old$_y$, new$_x$, new$_y$);
    old$_x$ := new$_x$;
    old$_y$ := new$_y$;
END;
END;

(* *Return to home position if the power is turned off.* *)
IF (old$_x$ - 0 OR old$_y$ - 0) THEN MoveVisor(old$_x$, old$_y$, 0, 0);
END;

Figure 25. Listing of the AutoVisor2 Procedure.

PROCEDURE AutoVisor2;

CONST

MaxHorizIndex = 7;

MaxVertIndex = 30;

FudgeFactor = 0.05;

$Default_x$ = 1000; (* *An x-coordinate far beyond the edge of the windshield.* *)

$Default_y$ = 500; (* *A y-coordinate far beyond the edge of the windshield.* *)

VAR

$old_x$, $old_y$, $new_x$, $new_y$: REAL; (* *The old and new x,y-coordinates of the shading position.* *)

$P_x$, $P_y$, $P_z$, $R_x$, $R_y$, $R_z$, $S_x$, $S_y$, $S_z$, $T_x$, $T_y$, $T_z$, r, s, t, det, $q_u$, $q_v$, $q_u$Prime, $q_v$Prime, $q_x$Prime, $q_y$Prime, $q_z$Prime, $d_x$, $d_y$: REAL; (* *See disclosure.* *)

h1, h2, v1, v2: INTEGER; (* *Running indices for horizontal & vertical grid lines.* *)

$mind_x$, $maxd_x$, $mind_y$, $maxd_y$: REAL; (* *The minimum and maximum of the slope values $d_x$ and $d_y$ for the lines connecting the eyepoint and the four grid points of a mesh.* *)

$fudge_x$, $fudge_y$: REAL; (* *The tolerance for comparing slope values.* *)

found: BOOLEAN; (* *True iff a mesh is found to intersect with the target-source line.* *)

$H_x$, $H_y$, $H_z$: REAL; (* *The x,y,z-coordinates of grid point H. cf. Figure 22.* *)

BEGIN

(* *Initialization.* *)

$old_x$ := $Default_x$;

$old_y$ := $Default_y$;

WHILE TRUE DO BEGIN

IF normalMode THEN BEGIN

$new_x$ := $Default_x$;

$new_y$ := $Default_y$;

(* *Get the u,v-coordinates of the point of incidence q.* *)

GetPointOfIncid($q_u$, $q_v$);

(* *Compute $d_x$ and $d_y$ from the coordinates of points q and m.* *)

$q_u$Prime := $q_u$ - $n_u$;
$q_v$Prime := $q_v$ - $n_v$;

$q_x$Prime := $q_u$Prime*$u_x$ + $q_v$Prime*$v_x$;
$q_y$Prime := $q_u$Prime*$u_y$ + $q_v$Prime*$v_y$;
$q_z$Prime := $q_u$Prime*$u_z$ + $q_v$Prime*$v_z$;
$d_x$ := $q_x$Prime / ($q_z$Prime + m);
$d_y$ := $q_y$Prime / ($q_z$Prime + m);

fudge$_x$ := $d_x$ * FudgeFactor;
fudge$_y$ := $d_y$ * FudgeFactor;

(* *For every mesh on the windshield ...* *)
h1 := 0; h2 := 1; v1 := 0; v2 := 1;
found := FALSE;
WHILE NOT found AND h1 < MaxHorizIndex DO BEGIN
    WHILE NOT found AND v1 < MaxVertIndex DO BEGIN mind$_x$ := Min4(gd$_x$[h1][v1], gd$_x$[h1][v2], gd$_x$[h2][v1], gd$_x$[h2][v2]);
        maxd$_x$ := Max4(gd$_x$[h1][v1], gd$_x$[h1][v2], gd$_x$[h2][v1], gd$_x$[h2][v2]);
        mind$_y$ := Min4(gd$_y$[h1][v1], gd$_y$[h1][v2], gd$_y$[h2][v1], gd$_y$[h2][v2]);
        maxd$_y$ := Max4(gd$_y$[h1][v1], gd$_y$[h1][v2], gd$_y$[h2][v1], gd$_y$[h2][v2]);

(* *If it satisfies the slope condition ...* *)
        IF $d_x$ > (mind$_x$ - fudge$_x$) AND $d_x$ < (maxd$_x$ + fudge$_x$) AND
           $d_y$ > (mind$_y$ - fudge$_y$) AND $d_y$ < (maxd$_y$ + fudge$_y$) THEN BEGIN

(* *Find its intersection with the target-source line.* *)
           $H_x$ := $g_x$[v1]; $H_y$ := $g_y$[h2]; $H_z$ := $g_z$[h2][v1];
           $P_x$ := $M_x$ - $H_x$; $P_y$ := $M_y$ - $H_y$; $P_z$ := $M_z$ - $H_z$;
           $R_x$ := $g_x$[v2] - $H_x$; (* $R_y$ = 0. *) $R_z$ := $g_z$[h2][v2] - $H_z$;
           (* $S_x$ = 0. *) $S_y$ := $g_y$[h1] - $H_y$; $S_z$ := $g_z$[h1][v1] - $H_z$;
           $T_x$ := $d_x$; $T_y$ := $d_y$; $T_z$ := 1;
           det := $R_x$*$S_y$*$T_z$ + $R_x$*$S_z$*$T_y$ - $R_z$*$S_y$*$T_x$; (* $R_y$ = $S_x$ = 0. *)
           r = ($P_x$*$S_y$*$T_z$ + $P_y$*$S_z$*$T_x$ + $P_x$*$S_z$*$T_y$ - $P_z$*$S_y$*$T_x$) / det;

IF r < -FudgeFactor OR (r - 1) > FudgeFactor THEN EXIT;

$$s = (R_x*P_y*T_z + R_z*P_x*T_y - R_x*P_z*T_y - R_z*P_y*T_x) / det;$$

IF $s <$ -FudgeFactor OR $(s - 1) >$ FudgeFactor THEN EXIT;

(* *The intersection is inside the boundary of the mesh. Compute the x,y-coordinates of the shading position.* *)

$$t = (R_x*S_y*P_z + R_x*S_z*P_y - R_z*S_y*P_x) / det;$$

$new_x := M_x - t * d_x;$ $new_y := M_y - t * d_y;$ found := TRUE;

END;

(* *If the intersection is not inside the mesh, try the next mesh.* *)

$v1 := v1 + 1; \quad v2 := v2 + 1;$

END; (* *going through vertical grid lines* *)

$v1 := 0; v2 := 1;$ $h1 := h1 + 1; \quad h2 := h2 + 1;$

END; (* *going through horizontal grid lines* *)

END ELSE BEGIN

(* $M_x$-$M_y$ *setting mode.* *)

$new_x := M_x;$ $new_y := M_y;$

END;

(* *Move the sunshade if the new shading position is different from the old.* *)

IF $(old_x - new_x$ OR $old_y - new_y)$ THEN BEGIN

MoveVisor2($new_x, new_y$);

$old_x := new_x;$ $old_y := new_y;$

END;

END;

END;

AUTOMATIC VISOR FOR CONTINUOUSLY REPOSITIONING A SHADING OBJECT TO SHADE A DESIGNATED LOCATION FROM A DIRECT RADIATION SOURCE

BACKGROUND OF THE INVENTION

There had been a dual problem with conventional sunshades on transportation vehicles:

(a) Their area of coverage was too big. Not only blocking the sun, they might also block a large portion of the vehicle occupant's view.

(b) Their area of coverage was too small. The sun often appeared outside the sunshade body to disturb the vehicle occupant.

This dual problem had been in existence since the first sunshade was put to use on a vehicle, and there had been many attempts in the prior art for improving the sunshade one way or the other, but there had been no practical solution that successfully solved the dual problem, as described below.

Prior Sunshades without Directional Sensitivity

There were suggestions to add extensions at the sunshade's bottom or on its sides so that the extensions could be pulled out when the sun appeared outside the sunshade's main body. But the main body being quite big already, with the extensions pulled out, a even larger portion of the driver's view would be blocked, more adversely affecting the safety of driving. Moreover, since the extensions had limited sizes, the sun might still appear at places beyond what could be blocked by the extensions.

Some suggested making the sunshade's main body movable, and some also suggested making its extensions slideable to different positions on its edge. But when the location of the sun changed, it was unsafe, or at least inconvenient, to manually move the sunshade or its extensions, to block the sun at the new location; especially when the road turned, or its slope changed, frequently and suddenly.

There were also suggestions to motorize the sunshade, such as U.S. Pat. Nos. 4,697,843 and 4,765,675, with electric, hydraulic, or pneumatic power, etc.; but manual intervention was still necessary with these systems.

Some also suggested adding the automaticity by incorporating a photodetector to control the movement of the sunshade. The photodetector may be a photoconductor, a photodiode, or a photocell, etc. When the sun appeared in the driver's sight, the sunshade could automatically appear or move into its operative position; and when the sun disappeared from the driver's sight, the sunshade could automatically disappear or return to is stowed position. Typical patents suggesting this kind of sunshades are: U.S. Pat. No. 3,695,681, Japan 1-186425, and Germany 2635-535. But this kind of automatic sunshade system only used the photodetector to detect the existence of the sun in the driver's sight, they could not follow the movement of the sun in the driver's sight.

Prior Sunshades with Directional Sensitivity

There were also suggestions to add some directional sensitivity to the automatic sunshade systems in order to track the movement of the sun. For example, U.S. Pat. No. 4,892,394 issued to Bidabad suggested using a compass means. Some others suggested using one or more photodetectors. Typical patented examples using a single photodetector are: U.S. Pat. No. 3,226,151 issued to Reuther and 4,641,922 issued to Jacob; examples using multiple photodetectors are: U.S. Pat. No. 3,961,181 issued to Golden, Japan 55-68422 issued to Ogawa, U.K. 2090570 issued to Haardt, and U.S. Pat. No. 4,874,938 issued to Chuang. They are summarized as follows.

Bidabad suggested using an electronic compass to sense the heading direction of the vehicle. He also suggested treating the windshield with electrochromic material and separating it into a number of sectors which could be selectively darkened to shield the sunglare. As the vehicle turned, based on the output of the compass means, the system could automatically shift the darkened sectors to continuously shade the driver's eyes.

Reuther suggested putting a photodetector in a housing at an appropriate height inside the automobile to detect the sun below a selected elevation. He also suggested using a mechanical sunshade which could be moved up and down to various heights. When the sun appeared above the selected elevation, the sunshade would remain in its inoperative position; when the sun set below this elevation, it would be detected by the photodetector, which would trigger the control circuit to drive the motors, so that the sunshade would automatically move into its operative position to shield the sunlight against the driver's eyes.

Jacob suggested using a lightshield in front of a photodetector. The lightshield had a special tapering shape to detect the sun at different elevations. He also suggested using a liquid crystal panel with another tapered shape to block the sun. Supposedly, with proper designs of the tapering shapes and a careful adjustment, this system could determine the elevation of the sun and move the non-transmissive area of the liquid crystal panel up or down to different levels to block the sunlight from reaching the driver's eyes.

Golden suggested the use of an array of photodetectors behind a pair of slots (or posts) to detect the sun at different azimuth directions. He also suggested to use an array of transparent but electrically darkenable zones, such as liquid crystals, to block the sunlight. The number of zones was the same as the number of photodetectors, and there was a fixed electrical cross-association between the zones and the photodetectors. With proper adjustment, when the line of photodetectors was parallel to the line of the liquid crystal zones, and the geometrical relation between the photodetectors and the slots is exactly similar to that between the zones and the driver's eyes, the system could detect the sun at different azimuth directions and block the sunglare against the eyes.

Ogawa proposed to attach a pair of photodetectors on the sunshade, and place a shadow board perpendicular to the sunshade between the photodetectors. The sunshade could move along a horizontal and semicircular track, always facing in the direction away from the circle's center, where the driver is seated. When the sunshade did not face in the direction of the sun, the shadow of the shadow board would fall on one of the photodetectors, creating a difference in the amount of sunlight received by the two photodetectors. The control circuit would sense the difference and automatically move the sunshade one way or the other to reduce the difference, until both photodetectors were exposed to the same amount of sunlight, when the sunshade directly faced in the direction of the sun. When this happened, since the driver was seated at the center of the circle, the sunshade would be located in the same direction as the sun relative to the driver and therefore block the sunlight towards the driver.

Both Haardt and Chuang proposed a sunshade which was mechanically movable along a horizontal track near the top of the windshield. When the sun appeared at a lower elevation, the sunshade had extensions that could be extended downward to shield the sun; otherwise, the extensions remained retracted in the sunshade's main body. They also suggested using a number of photodetectors to detect the sun. As described in Chuang's patent, a multitude of "direction detectors" were used. Each of the direction detectors is devoted to detect the sun in a predetermined direction and produce a signal representing the predetermined direction. With each direction detector responsible for a separate detecting territory in space, each territory covering a limited range of azimuth and elevation angles of the sun, the multitude of direction detectors collectively covered a wide range of directions of the sun. The separate signals from these direction detectors were fed to an electric control circuit to move the sunshade to block the sun accordingly.

Shortcomings of Prior Sunshades with Directional Sensitivity

The above automatic sunshade systems more or less had some directional sensitivity, but there were shortcomings with these systems. Some of the shortcomings are described below.

With a compass means, Bidabad's system could only determine the attitude of the vehicle. It could not determine the elevation of the sun. And it required the driver to instruct the system about the initial direction of the sun, before it could correctly function in tracking the direction of the sun relative to the car. Moreover, it assumed that the sun remained fixed in the sky. As a matter of fact, the sun always changes its location relative to the earth as the earth spins. Thus before long this system would not be able to correctly function unless the driver reinstructed the system about the new direction of the sun from time to time.

Both Reuther and Jocob's systems employed a sunshade that was as wide as the windshield in the horizontal direction. Hence when the elevation of the sun was low, the whole area of the windshield from the roof down to the lower edge of the sunshade would be blocked, leaving only a narrow strip at the bottom of the windshield for the driver to see through. It could be quite dangerous to drive under this situation. In addition, both systems only used one photodetector. Their directional sensitivity were very limited compared to systems using multiple photodetectors.

With Reuther's system, although we may select different elevations below which the sun would be detected by the photodetector, there could only be one elevation selected at any one time. The photodetector was basically used as a switch for the sunshade system, which was turned on when the sun appeared below the selected elevation. Once turned on, the sunshade would automatically move into position to shield the sunglare; however, it still could not follow the movement of the sun below the selected elevation.

With Jacob's system, it would require a substantial research effort to come up with proper tapering shapes for the lightshield and the liquid crystal panel, and manufacture accordingly, for the system to really work as suggested. Since there were factors other than the elevation of the sun, such as the weather, which may affect the amount of sunlight received by the photodetector behind the lightshield, it was doubtful that the system could reliably determine the elevation of the sun.

Golden's system, with both the array of photodetectors and the array of lightshielding zones being linear, could only track the sun's movement in one dimension. In addition, it would require a difficult mechanical adjustment, most likely by trial and error, for the system to work for a particular driver in a particular placement of the seat. Moreover, as mentioned earlier, this system required an exact geometric similarity between its light-sensing and light-blocking parts. If the surface of the shading screen was curved, it would be difficult to arrange the many photodetectors in exactly the same curve. But if the shading screen was flat, to work for a wide range of directions of the sun, the bulk of the shading screen would have to be installed somewhere behind the windshield in front of the driver's face that would be very awkward and potentially hazardous.

Ogawa's system could only detect the azimuth direction of the sun. Moreover, it required a semi-circular track, which was also awkward to be installed inside or outside a normal automobile. In addition, this system required that the driver be seated at the center of the circle. It would not work, if the driver adjusted her seat off the center.

There were also quite a few shortcomings with Haardt and Chuang's system. First of all, they both suggested extending the sunshade downward when the elevation of the sun was low. This is undesirable because when the sunshade was extended, it would block a larger area of the driver's view. This is understandable because, as stated on lines 24 to 31 in column 4 of Chuang's patent, it was an object of his to cope with the sun at different elevations by providing a sunshade which was expandable in size. In other words, this object only aimed at solving one part of the dual problem mentioned earlier, i.e., the sunshade's area of coverage being too small. As will be clear from the description that follows, Chuang's system was not meant to solve the other part of the dual problem, i.e., the sunshade's area of coverage being too big.

Another problem with their systems is their mechanical sunshade. When the car rode on a hill or made a turn, the relative location of the sun may change quickly. If the sunshade could not move (or extend) as quickly, the driver would suffer from the sunglare during the transition. But if the sunshade could move very fast, it would be very dangerous for the occupants in the car. This is especially true when the sunshade could only be positioned at a few selected positions, as was the case with Chuang's system.

There is another problem with Chuang's system. Assume that for each elevation we used k (k being a number) direction detectors to detect k azimuth directions of the sun at the same elevation. Since they only produced k different signals, the sunshade could only be positioned at k different positions at this elevation. When the sunshade was positioned at one of these positions, it must be able to shield the sunlight towards the driver's eyes from all possible azimuth directions within the detecting terriority of the corresponding direction detector. When k was small, the range of azimuth angles for each direction detector to cover had to be very large.

For example, as shown in FIG. 20 of Chuang's patent, k=7. In other words, 7 direction detectors were used to detect 7 selected azimuth angles, covering an overall range of azimuth angles from $-5°$ to $185°$ at the same elevation. The direction detector for detecting the azimuth direction $\psi_3$ ($\psi_3 = 45°$), for example, was responsible for detecting all sunlight with an azimuth angle within a range of $\Delta\psi_3 = 45°$, from $22.5°$ to $67.5°$. (cf. lines 14 and 44 in column 6 on Chuang's patent.)

To block sunlight in such a wide range of azimuth angles, the sunshade had to be unacceptably wide. This is another indication that Chuang's system was not intended to solve the other part of the dual problem, i.e., to reduce the area of coverage of the sunshade.

In addition, Chuang's system had inherent problems to work with a small sunshade, because the smaller the sunshade, the more precisely the system had to position the sunshade. To support more precise positioning, the direction detectors' detecting territories must be smaller, and there must be more direction detectors. For example, suppose we would like the precision to be $0.5°$. To cover a total range of $190°$ in azimuth angles and, say, $45°$ in elevation angles, we would need at least $(190/0.5)(45/0.5) = 34,200$ direction detectors! Even if we reduced the precision to $2°$, we would still need more than 2,000 direction detectors. But there was no teaching in the prior art as to how so many direction detectors could be precisely manufactured, correctly installed and wired, and properly tested, at a reasonably low cost. Evidently, it would be impractical, if at all possible, for Chuang's system to support the high precision required for a small sunshade.

Moreover, even if we assumed that somehow a large number of the direction detectors were successfully assembled, it was still impractical to operate the system with a small sunshade, because there was no easy way to precisely locate the eyes. Chuang only suggested that, when the system is in operation, if the driver shifts her position, the system could be adjusted by inserting new instructions through the keyboard, or automatically adjusted according to the placement of the seat. However, there was no mentioning at all as to how the initial location of the eyes was determined. Therefore unless the sunshade was at least as big as the conventional sunshades, Chuang's system could not easily work for different vehicle occupants of various stature and poise in various placement of the seat. Imagine putting this system to real use with a small sunshade. How awkward it would be, if the driver had to rely on a graduated ruler to measure the three-dimensional coordinates of her own eyes relative to the origin of some coordinate system, and then manually insert the coordinates in a certain devised format of instructions via the keyboard!

Objects

It is therefore an object of the present invention to provide a practical solution for the dual problem mentioned hereinbefore. It is another object to provide an automatic sunshade system that avoids some of the limitations of the prior systems. It is another object to provide such a system that may work with a small sunshade. It is another object to provide such a system with means for precisely determining the location of the eyepoint. It is another object to provide such a system with practical means for providing spatial information from which the source's location or direction may be determined with a high precision. It is another object to provide such a system with means for positioning a small sunshade. It is another object to provide such a system with a sunshade that may vary its size according to its distance from the eyes, the desired precision of the system, and the distance between the eyes. It is another object to provide such a system with a non-mechanical sunshade, for safety and ease of installation and maintenance. It is another object to provide such a system that works even if the eyes' location frequently changes. It is another object to provide methods and devices generally useful for continuously repositioning a small shading element to shade an eyepoint from direct rays originated from a source in motion relative to the eyepoint.

These objects, as well as some other objects, features, and advantages of the present invention will be described further with particular embodiments and accompanying drawings, which are not to be regarded as limiting the scope of the present invention.

BRIEF DESCRIPTION OF THE DRAWINGS

FIG. 23 is the listing of the Auto Visor procedure.

FIG. 25 is the listing of the Auto Visor2 procedure.

These figures are not drawn to scale.

DETAILED DESCRIPTION

The methods and devices of the present invention are generally useful for continuously repositioning a small object to be always in line with two points of interest that are in motion relative to each other. In a specific application, they are useful for continuously repositioning a small shading element to precisely shade an eyepoint from the direct rays originated from a source of radiation in motion relative to the eyepoint.

Figure 1:
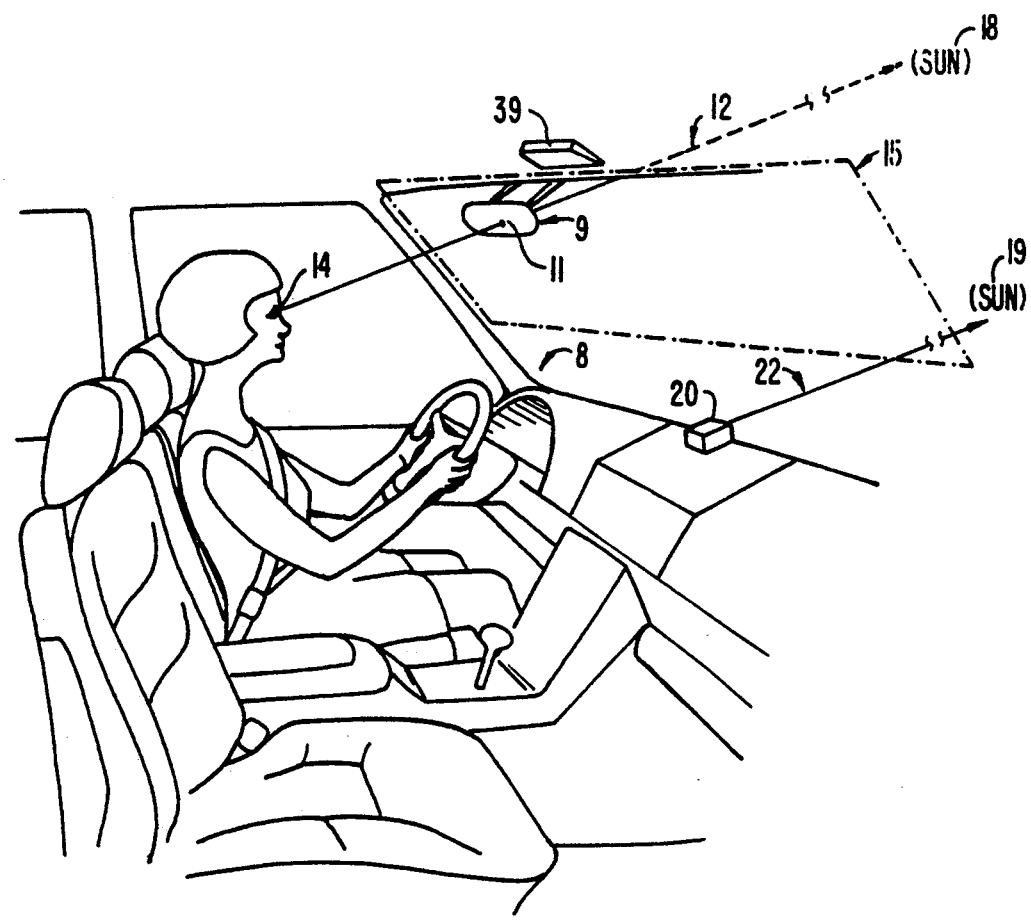
FIG. 1 is an internal view of an automobile in one embodiment of this invention.

FIG. 1 shows a particular embodiment of the invention as an automatic sunshade system installed on a transportation vehicle. In this embodiment, the source is the sun 19, the radiation is the sunlight, the eyepoint 14 is the location of a vehicle occupant's eyes, and the shading element 9 is a sunshade or sunvisor, which is always repositioned to shade the eyepoint from direct sunlight 12.

The size of the sunshade is preferably close to the minimum size required to produce an umbra enclosing the eyes. It does not matter if the system treats the left eye, the right eye, or the middle point between the eyes, etc., as the eyepoint. When the middle point between the eyes is chosen as the eyepoint, the sunshade will be centered at the computed shading position 11. When the left or right eye is chosen as the eyepoint, the sunshade can also be positioned accordingly with appropriate shift to the side. In any case, the operation is virtually the same.

Methods with Indirect Eyepoint Determination

A method of the present invention comprises the following four steps:

(a) Find a first geometric entity containing the eyepoint.

The geometric entity may be, for example, a line, a plane, a cylinder, or a cone, etc.

(b) Find a second geometric entity containing the eyepoint.

Preferably the intersection of the two geometric entities only contains a single point in space, or approximates a single point for practical purposes.

(c) Find a point in the intersection of the two geometric entities.

(d) Continuously reposition the shading element to shade the point found in step (c) from the direct rays.

Preferably the two geometric entities are the eye-source lines. An eye-source line is one which connects the eyepoint and the source. Thus in a preferred embodiment, the method comprises the following four steps.

(a) When the source is located at a first location, obtain spatial information sufficient for determining the first eye-source line, which is the line connecting the eyepoint and the first location of the source.

The spatial information may be, for example, the locations of any two points on the first eye-source line. As another example, it may be the direction of the line and the location of any point on the line.

(b) Similar to step (a), when the source is located at a second location significantly away from the first eye-source line, obtain spatial information sufficient for determining the second eye-source line, which is the line connecting the eyepoint and the second location of the source.

(c) Find the point of intersection of the two eye-source lines.

(d) Continuously reposition the shading element to be substantially in line with the point of intersection and the source, so that the point of intersection is shaded by the shading element from the direct rays. For example, this step may be accomplished by repeating the following substeps, (d.1), (d.2), and (d.3):

(d.1) Obtain spatial information sufficient for determining the line connecting the point of intersection and the current location of the source;

(d.2) Select a shading position between the point of intersection and the source, in accordance with the location of the point of intersection and the spatial information obtained in substep (d.1). The shading position is substantially in line with the point of intersection and the current location of the source, so that the shading element positioned at the shading position will shade the point of intersection from the direct rays.

(d.3) Position the shading element at the shading position.

Since the point of intersection should be coincident with, or sufficiently close to, the eyepoint, the shading element will always shade the eyepoint from the direct rays.

Simplification with Imaginary Source

The source in steps (a) and (b) above may be imaginary. That the source is imaginary means that the actual source is ignored and that an imaginary source is assumed to be located at some known location or direction away from the actual source. Knowing the location or direction of the imaginary source, we only need to obtain the location of a point on the line connecting the eyepoint and the imaginary source to determine the line.

If the source is imaginary in either step (a) or step (b), the method may be simplified in the sense that both steps may be accomplished with the actual source at one location. For example, if the source is imaginary in step (a), we do not have to wait for the actual source to be located at a different location to do step (b).

Simplification with Repositioning Means

The method can also appear to be simplified if we have a repositioning means which continuously repositions the shading element substantially in line with the source and a designated location in space called the target, so that the target is always shaded from the direct rays. A typical repositioning means may comprise, for example, the following:

(1) Means for positioning the shading element.

(2) Means for providing spatial information sufficient for determining the target-source line, given the location of the target. A target-source line is one which connects the target and the source. The spatial information may be, for example, the location of the source, an image of the source captured from a known perspective, or other information from which the direction of the source relative to the target may be derived, etc.

(3) Means for selecting a shading position between the target and the source substantially in line with the target and the source in accordance with the designated location of the target and the spatial information obtained in (2), so that the shading element positioned at the shading position will shade the target from the direct rays.

(4) Means for producing signals for the means for positioning the shading element to position the shading element at the shading position.

With the repositioning means, the shading element can be moved by changing the location of the target. If the geometric entities in steps (a) and (b) are the eye-source lines, the method may become the following:

(a) When the source is located at a first location, move the target until the shading element is repositioned by the repositioning means accordingly at a position where the eyepoint is shaded from the direct rays.

(b) Similarly, when the source is located at a second location significantly away from the first eye-source line, move the target until the shading element shades the eyepoint.

(c) Find the point of intersection of the two eye-source lines.

(d) Move the target to the point of intersection.

In step (a) or step (b), when the target is moved so that the shading element shades the eyepoint, if the shading element is small, both the target and the shading element must be substantially in line with the eyepoint and the source. Since the means for providing the spatial information continuously provides the information sufficient for determining the target-source line, the spatial information for determining the first or second eye-source line is automatically obtained.

Step (d) also appears to be simplified due to the functionality of the repositioning means. Recall that the point of intersection should be coincident with, or sufficiently close to, the eyepoint. Because the repositioning means always repositions the shading element to shade the target from the direct rays, with the target coincident with the point of intersection, the shading element will shade the eyepoint from the direct rays.

Simplification with Repositioning Means and Constrained Target Movement

If in step (b) above we constrain the target's movement to be along the first eye-source line, the method will appear even more simplified. Namely, with the repositioning means, the method will appear to only comprise the following two explicit steps:

(a) when the source is located at a first location, repeatedly move the target until the shading element shades the eyepoint; and (b) when the source is located at a second location significantly away from the first eye-source line, move the target along the first eye-source line until the shading element shades the eyepoint.

At the end of step (b), the target should already be located at the point of intersection, therefore steps (c) and (d) are automatically accomplished at the same time.

Simplification with Repositioning Means, Constrained Target Movement, and Imaginary Source The coordinate system being used may be Cartesian in which the three axes, say, the x, y, and z axis, are perpendicular among one another. In step (a) above we may assume an imaginary source sufficiently remote from the target, so that the target-source line is always parallel to one of the axes, say, the z axis. Therefore in step (a), when the shading element is repositioned to shade the eyepoint from the imaginary rays, the target's x,y-coordinates will be the same as those of the eyepoint; and in step (b), when the target is constrained to move along the first eye-source line, only the z-coordinate of the target may change. Thus the method will appear to only comprise the following two steps:

(a) Change the x- and y-coordinates of the target until the shading element shades the eyepoint from the imaginary rays.

(b) Change the z-coordinate of the target until the shading element shades the eyepoint from the actual rays.

Similarly, the method may work in a two dimensional coordinate system. The coordinate system may be Cartesian, in which the two axes, say, the x and z axis, are perpendicular to each other. The imaginary source may be assumed to be sufficiently remote from the target, so that the target-source line is always parallel to the z axis. Therefore in step (a), when the shading element is repositioned to shade the eyepoint from the imaginary rays, the target's x-coordinates will be the same as that of the eyepoint; and in step (b), when the target is constrained to move along the first eye-source line, only the z-coordinate of the target may change. Thus the method will appear to only comprise the following two steps:

(a) Change the x-coordinate of the target until the shading element shades the eyepoint from the imaginary rays.

(b) Change the z-coordinate of the target until the shading element shades the eyepoint from the actual rays.

Methods with Direct Eyepoint Determination

Another type of the methods of the present invention comprises the following two steps:

(a) Determine the location of the eyepoint using an automatic equipment, such as one that determines the location of an object by generating and receiving acoustic or electromagnetic waves; and (b) Continuously reposition the shading element sufficiently in line with the source and the determined location of the eyepoint, so that the shading element shades the determined location from the direct rays.

Again, with a repositioning means such as one described previously for continuously repositioning the shading element to shade a target from the direct rays, the step (b) above will become simply moving the target to the determined location.

This type of method is particularly useful when the eyepoint is not stationary. We may continuously repeat the two steps, so that even if the eyepoint keeps changing its location, it will always be shaded.

Devices

In one embodiment of the present invention, the device comprises the following:

(a) a shading element, (b) a holding means for holding electrical values representing a designated location, which is referred hereinafter as the target, (c) a repositioning means for continuously repositioning the shading element to shade the target from the direct rays originated from the source, and (d) a calibrating means for determining the location of the eyepoint and changing the values held by the holding means to represent the determined location of the eyepoint;

The values held by the holding means are referenced by the repositioning means in selecting the shading position, and the values may be changed by the calibrating means.

The repositioning means may be similar to what is mentioned before. For example, it may comprise (1) means for positioning the shading element;

(2) a source-tracking means for providing spatial information relating to the source; and (3) means for selecting a shading position in accordance with the values held by the holding means and the spatial information provided by the source-tracking means, and producing signals for the means for positioning the shading element to position the shading element at the shading position, so that the target is shaded from the direct rays.

With the calibrating means, there will be no need to directly measure the eyepoint's location using a graduated ruler. Since the repositioning means continuously repositions the shading element to shade the target from the direct rays, once the calibrating means moves the target to the determined location of the eyepoint, the repositioning means will always reposition the shading element to shade the eyepoint from the direct rays.

Hence with the calibrating means, the device may solve the dual problem mentioned earlier in a practical manner by providing a small sunshade and the high precision necessary for repositioning the small sunshade to shade the eyes from direct sunlight. Put more elaborately:

(1) The sunshade is small, preferably close to the minimum required to produce an umbra to shade the eyes, so that the sunshade only shades a small area when it is positioned at any particular position.

(2) The sunshade is movable, preferably in two dimensions, so that by moving to different positions it can shade the eyes from direct sunlight in different directions.

(3) Both the location of the eyepoint and the spatial information for determining the target-source line are obtained with sufficiently high precision, so that the shading position may precisely be determined.

(4) The positioning of the sunshade also has a high precision, so that the sunshade may be precisely positioned at the determined shading position.

In other words, one part of the dual problem, the sunshade's area of coverage being too big, is solved by providing a very small sunshade which only shades the eyes from direct sunlight, leaving most of the driver's view unblocked; while the other part of the dual problem, the sunshade's area of coverage being too small, is solved by precisely positioning the small sunshade to different positions to shade the eyes. To support precise positioning, the system must precisely determine the eyepoint's location, obtain precise spatial information for selecting a shading position, and precisely position the sunshade.

The prior sunshade systems could not practically solve the dual problem, because most of them could not support the precision required to position the small sunshade, and none of them provided any means to determine the location of the eyepoint and automatically move the target to the determined location of the eyepoint.

Shading Element

To solve the dual problem, as mentioned before, the size of the shading element should be small, preferably close to the minimum required to produce an umbra covering the eyepoint. Take the embodiment of an automatic sunshade system installed on an automobile as an example. The sun only subtends an angle of about a half degree from the vehicle occupant's eyes. Therefore if the sunshade is located immediately behind the windshield on a typical automobile, and the sunshade comprises two coin-sized plates separated by a distance about the same as that between the two eyes, the sunshade will be large enough to shade both eyes from the sunlight. It is desirable, although not required, that the size of the two plates is variable, so that when the sun is in front of the driver, the plates being closest to the eyes, their size is smaller; whereas, when the sun appears closer to the left or right side of the windshield, the plates being farther away from the eyes, their size is bigger. The distance between the two plates may also be varied depending on the exact distance between the two eyes. If the system assumes the eyepoint to be stationary, the size of these two plates may be enlarged by a couple of inches to allow some room for the driver to move her head during travel.

The shading element may be made of any material that filters, blocks or diminishes the radiation from the source. For example, the sunshade can be made of plastic, electrochromic material, or liquid crystals, etc.

The sunshade may be mechanically supported and driven by electric motors to be positioned at the shading position. But this kind of mechanical sunshades are less preferred, because they may not respond very quickly, they may be hard to maintain, and a fast moving mechanical sunshade can be hazardous for the occupants in the vehicle.

An alternative is to divide the windshield into a number of cells and let the sunshade be formed by changing the transmittance of light through some selected cells in the vicinity of the shading position. It is preferred that each cell is sufficiently small, so that the sunshade is formed by many cells, instead of only a few cells, in order to support smooth movement and more precise positioning of the sunshade.

Calibrating Means

The calibrating means may comprise an infrared ranging device to determine the location of the eyepoint, and means for automatically changing the target's location to the determined location. As another example, instead of generating electro-magnetic waves, the calibrating means may comprise means for generating acoustic waves, similar to the 3D Head Tracker from Logitech, to determine the eyepoint's location. This kind of calibrating means is particularly useful when the location of the eyepoint is always changing in the coordinate system. In which case, the calibrating means may comprise means for continuously determining the current location of the eyepoint and means for continuously updating the target's location with the current eyepoint's location so determined. Thus the calibrating means becomes more like an eyepoint-tracking means that continuously tracks the current location of the eyepoint and updates the system with the current location of the eyepoint.

However, in cases where the eyepoint practically remains stationary in the coordinate system or that its location does not change too much or too often, the calibrating means many not comprise means that generate any waves, as described below.

Without any means to dynamically determine the location of the eyepoint, if the calibrating means comprises (a) means for the user to adjust the values, so that the location of the target represented by the values may be moved, and the eye-source line may be found by the user adjusting the values to move the target until the repositioning means repositions the shading element accordingly to a position where the direct rays to the eyepoint are shielded by the shading element; and (b) means for automatically computing the intersection of two eye-source lines and changing the values to represent the location of the intersection;

then the device will work with the four-step method described before and continuously shade the eyepoint from the direct rays.

For example, the means for the user to adjust the values may comprise a switch connected to an electrical circuit which comprises a microprocessor, and the values may be the coordinates of the target stored in the memory being accessed by the microprocessor. Pushing the switch one way or the other may result in the increase or decrease of the target's coordinates stored in the memory. After the two eye-source lines are found, the microprocessor automatically computes the coordinates of the eye-source lines' intersection and changes the target's coordinates to those of the intersection.

Alternatively, if the calibrating means comprises means for the user to freely adjust the values and means for the user to adjust the values under the constraint that the target can only move along the first eye-source line, the device will work with the two-step method described before.

Repositioning means

The repositioning means may comprise an electric circuit. The means for positioning the shading element may comprise conventional means to support and move the shading element. It may be electro-mechanical or non-mechanical. It can be very cost effective to use a programmable device such as a microprocessor or microcontroller operated under a program control for selecting the shading position and producing signals to position the shading element at the shading position. The spatial information provided by the source-tracking means may be, for example, the location of the source. Alternatively, it may be an image of the source. It can also be some information sufficient for determining a line containing the source and a known point, or other information sufficient for determining a plane containing the source and a known line, etc. Thus the source-tracking means has many different variations. Following are some examples:

Variation 1

In a less preferred but advantageous embodiment, the source-tracking means comprises the following:

(1) means to determine the location of the earth relative to the sun, using, say, a clock and a software function telling the location of the earth relative to the sun at any given time based on well known astronomical data;

(2) means to determine the location of the car relative to the earth, using LORAN or a global positioning satellite system, etc.;

(3) means to determine the attitude of the car, using, for example, a magnetometer; and (4) means to determine the inclination of the car, using, say, a two directional level and some photodetectors.

Based on the information provided by this kind of source-tracking means, the microprocessor may derive the location of the sun in the coordinate system which moves with the car. Knowing the location for the sun so determined, the geometry of the shading surface on which the sunshade moves, and the target's location, the microprocessor can select a shading position by finding the position where the shading surface intersects with the line connecting the sun and the target, and produce appropriate signals to position the sunshade at the shading position. If the target coincides with the eyepoint, the sunshade positioned at the shading position will shade the eyes from direct sunlight.

Variation 2

If the sunshade system is installed inside a building instead of a transportation vehicle, since the location and orientation of the building are known, the source-tracking means need not have parts (2), (3), and (4) above. With the system installed on a window, a person sitting at the window may enjoy a broad field of view while his eyes are always shaded from direct sunlight.

Variation 3

In cases where the sunshade only has one degree of freedom to move, the source-tracking means may comprise a plane-finding means. The plane-finding means is installed in a known orientation, and it serves to provide information so that a reference plane containing the sun (or a point sufficiently close to the sun for our purposes) and a known line may be determined.

Figure 2:
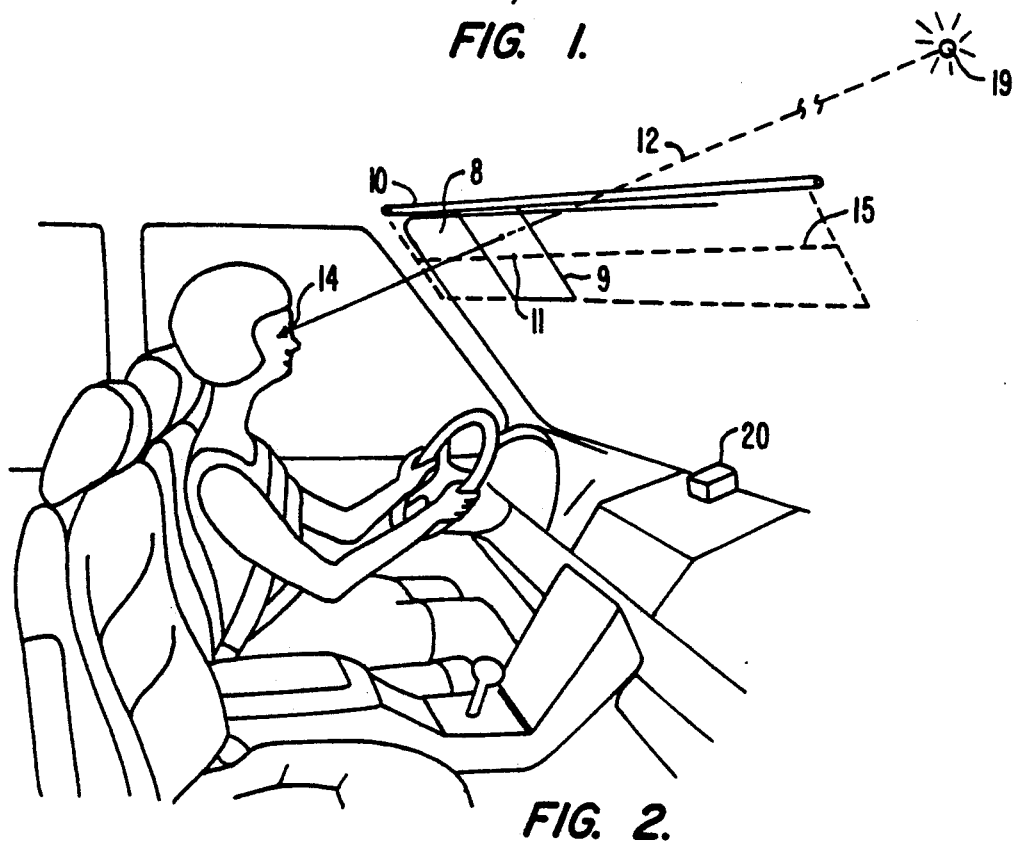
FIG. 2 is an internal view of an automobile in one embodiment of this invention.
Figure 3:
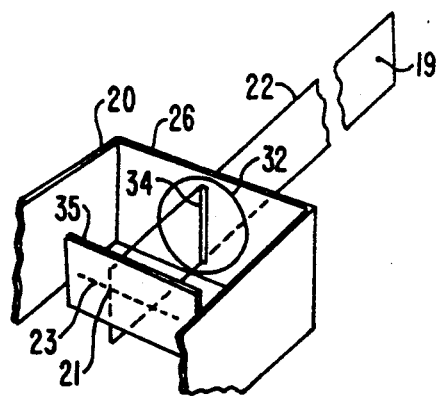
FIG. 3 is a magnified view of a plane-finding means with some parts of the walls removed to show its interior.

For example, refer to FIG. 2 and 3. FIG. 2 is an internal view of an automobile. FIG. 3 is a magnified view, not to scale, of the plane-finding means of this embodiment with some parts of the walls removed to show its interior. The sunshade 9 of this embodiment may move along a track 10 behind the windshield. The sunshade is narrow in the horizontal direction, but it is still wide enough to shade both eyes from direct sunlight. Since the sunshade does not move in the vertical direction, it is longer in the vertical direction in order to shade the eyes from direct rays in different elevations. We use the middle point between the two eyes as the eyepoint 14. The trace where the center 11 of the sunshade may pass forms a shading curve 15. The plane-finding means may comprise, for example, a one-dimensional CCD (Charge Coupled Device) 35 enclosed inside a box 20 which has a narrow slit 34 on the front wall 26 of the box. The slit is cut vertically, with a width substantially smaller than the length of the array 23 of photo-responsive sites in the CCD. The array of photo-responsive sites in the CCD is arranged horizontally. The location of the slit is known and the slit may serve as the aforementioned known line contained by the reference plane 22. The sunlight passing through the slit strikes on a very small segment of the array of photo-responsive sites. The center point 21 of the segment and the line of the slit determines the reference plane 22 which contains the sun 19, or a point sufficiently close to the sun for our purposes. Due to the function of the calibrating means, the target is coincident with the eyepoint. Since the sun is remote from the car, the direct sunlight 12 towards the eyepoint 14, which is coincident with the target, is parallel to the reference plane. The microprocessor may find the center point of the photo-responsive sites exposed to the sun and determine the reference plane from the locations of the center point and the slit. Then it may compute the shading position 11 by finding the position where the shading curve intersects with the plane which contains the target and is parallel to the reference plane.

Note that, for embodiments such as this one, it is possible that the microprocessor ignores the vertical dimension in its computation, considering all objects only in terms of their projections on a horizontal plane.

Variation 4

In another similar embodiment, the sunshade only moves in the vertical direction but not the horizontal direction. The vertical size of the sunshade is significantly smaller than the sunshades in the prior art but its umbra is large enough to cover the eyes. Its size in the horizontal direction may be larger, in order to shade the eyes from direct sunlight in different azimuth directions. The source-tracking means may be the same as above, except that the slit is horizontal and the array of photo-responsive sites is vertical.

Variation 5

Figure 4:
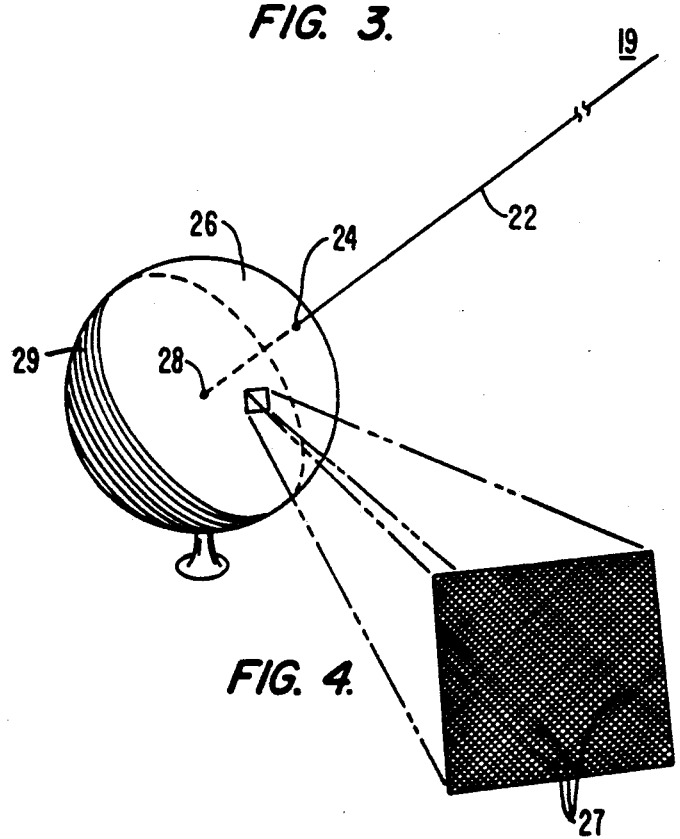
FIG. 4 shows one embodiment of a line-finding means.

In another embodiment of the invention as a sunshade system where the sunshade may move in two dimensions, the source-tracking means may comprise a line-finding means. The line-finding means is installed in a known orientation, and it provides information so that a reference line containing the sun (or a point sufficiently close to the sun for our purposes) and a known point may be determined. FIG. 4 shows an example in which the line-finding means is one that comprises a number of photodetectors 27 spanning the surface of a sphere 29. The sphere is fixed on the vehicle. The location of the center 28 of the sphere is known, and it may serve as the aforementioned known point. At any instant in time, only those photodetectors on the hemisphere 26 facing the sun are exposed to direct sun light. The reference line 22 is one that connects the center 28 of the sphere and the center point 24 on the surface of the hemisphere exposed to the sun. Clearly, the reference line contains the sun 19, or a point sufficiently close to the sun for our purposes.

The system may be installed on a car like what is illustrated in FIG. 1. The source-tracking means may be enclosed in a transparent box 20. Since the sun is remote from the system, its direct rays 12 toward the target or the eyepoint are essentially parallel to the reference line 22. Hence knowing the location of the target and the geometry of the shading surface 15 on which the shading element moves, the microprocessor may determine the reference line and compute the shading position as the position 11 where the shading surface intersects with the line which contains the target and is parallel to the reference line. Since the target is moved by the calibrating means to the eyepoint, the sunshade positioned at the shading position will correctly shade the eyepoint from direct sunlight.

Variation 6

Figure 5:
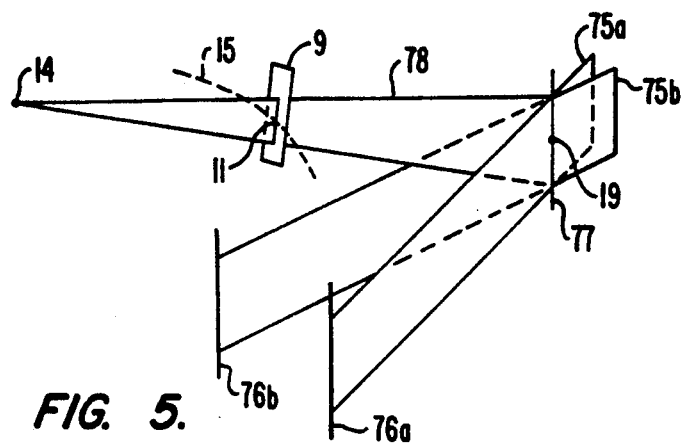
FIG. 5 illustrates how two plane-finding means may be used for determining the shading position.

In cases where the source is not remote and the shading element is only movable in one dimension, the source-tracking means may comprise, for example, two plane-finding means. Refer to FIG. 5. The shading element 9 only moves in one dimension. The locations and orientations of the plane-finding means on the vehicle are known. Each plane-finding means provides information so that a reference plane 75 containing the source 19 (or a point close enough to the source for our purposes) and a known line 76 may be determined. If a plane-finding means such as the ones mentioned above is used, the known line may be the line of the slit. Preferably, the two known lines 76a and 76b are parallel to each other and both are perpendicular to the dimension in which the shading element moves. The two reference planes must intersect on a reference line 77 which contains the source 19 or a point sufficiently nearby. Since the shading element has one degree of freedom to move, its center may move along a shading curve 15. The repositioning means may determine the shading position 11 by finding the intersection of the shading curve 15 with the plane 78 defined by the reference line 77 and the target 14.

Variation 7

Figure 6:
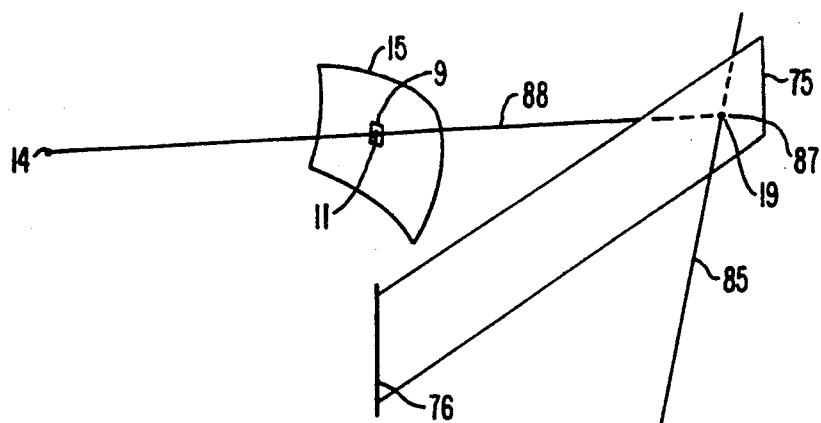
FIG. 6 illustrates how a plane-finding means and a line-finding means may be used for determining the shading position.

Refer to FIG. 6 for another embodiment. In cases where the source 19 is not remote from the system, and the shading element 9 is movable in two dimensions, the source-tracking means may comprise, for example, a plane-finding means and a line-finding means. The plane-finding means provides information so that a reference plane 75 containing the source 19 (or a point close enough to the source for our purposes) and a known line 76 may be determined. If a plane-finding means such as the ones mentioned above is used, the known line may be the line of the slit. The line-finding means provides information so that a reference line 85 containing the source 19 (or a point close enough to the source for our purposes) and a known point 86 may be determined. The reference plane and the reference line must intersect at a reference point 87. The reference point may be where the source is or a point sufficiently near the source for our purposes. Since the shading element has two degrees of freedom to move, all possible positions of its center forms a shading surface 15. The shading position 11 may be computed as the intersection of the shading surface with the line 88 defined by the reference point 87 and the target 14.

One kind of the source-tracking means, such as the spherical line-finding means and those CCD's described above, comprises a sensing means and a varying means. The sensing means comprises a number of sensing sites on a sensing region responsive to the radiation. The varying means causes an uneven distribution of the radiation over these sensing sites due to the geometric arrangement of the varying means and the sensing sites. The varying means may allow multiple sensing sites to be exposed to the radiation at the same time, so the microprocessor does not rely on each sensing site to detect a predetermined direction of the source and produce a signal representing the same. Instead, the microprocessor selects the shading position in accordance with the location of the target, the distribution, and the geometric configuration of the source-tracking means.

Other than a CCD, the sensing means may also be a video camera tube, an exposed RAM (Random Access Memory), or just a number of photodetectors, etc. The varying means may be an aperture, a lens, or a surface of a known geometry, etc.

This kind of source-tracking means is better than those directional sensors employed in the prior sunshade systems in many respects. Some of the major advantages are the following:

(a) With multiple sensing sites, its directional sensitivity is generally better than those with a single photodetector or only a few photodetectors, such as those suggested by Reuther, Jacob, and Ogawa.

(b) It does not require auxiliary structures, such as Chuang's light paths and Jacob's light shield, that are difficult to be made to support the desired high precision.

(c) It does not require mechanical moving parts such as the moving sensor suggested by Ogawa and the adjustable light-sensing structures suggested by Golden.

(d) Unlike the direction detector suggested by Chuang, it does not require each sensing unit to be carefully installed in a predetermined orientation.

(e) Unlike what is suggested by Golden, it does not require the same number of liquid crystal zones as the photodetectors and the difficult adjustment necessary for obtaining an exact geometric similarity among different parts of the system.

(f) Many source-tracking means of this kind, such as the exposed RAM and the CCD, etc., are already available commercially in large quantities, with high resolution, high reliability, and low cost.

(g) Also available are means for scanning the sensing sites for many source-tracking means of this kind, eliminating the need to provide individual wiring to the multitude of sensing sites such as would be necessary for Chuang or Golden's systems.

Advantages

Thus the present invention has reduced to practice an automatic sunshade system on a transportation vehicle. The occupant in the vehicle does not have to manually move the sunshade or its extensions, but she can enjoy a broad field of view while her eyes are always shaded from direct sunglare. It works even though the sun does not stay at a fixed location in the sky, the road is not straight and level, the occupant's head may move, the placement of the seat may change, and the occupant may be replaced by someone of a different height. The system not only makes it more pleasant to travel, but also increases the safety of driving.

In addition to land transportation, the sunshade system can be used for transportation on water and in the air. It can also be installed on places other than a transportation vehicle.

The invention can also be applied on a vehicle to shade the eyes from the headlight glare of on-coming vehicles. The system may comprise a number of small shading element, each shading an eye from the rays originated from a headlight, so that both eyes are shaded from every headlight in sight.

Advantages over Prior Sunshade Systems

Some advantages of the sunshade system of the present invention over conventional automatic sunshade systems are listed below:

(1) The system comprises means for easy and precise determination of the location of the eyes. It not only eliminates the need for the vehicle occupant to manually measure the location of the eyes using a graduated ruler or other difficult method, but also makes it possible for the system to precisely position a small sunshade.

(2) The system comprises means for automatically changing the location of the target to the determined location of the eyes, eliminating the need to manually input the coordinates of the eyes to the system.

(3) In some embodiments, with means that can continuously determine the location of the eyes and continuously update the target's location with the current location of the eyes, the system can always adjust itself to work, even if the location of the eyes keeps changing.

(4) In some preferred embodiments, the technology for the manufacture of every parts in the sunshade system have been available with a high precision and reliability at a low cost.

(5) The sunshade system of the present invention can support the high precision required for a sunshade significantly smaller than conventional sunshades. The driver can therefore have a broader view of the road conditions ahead, and it is less likely for the sunshade to block her view of traffic signals and signs. Although the sunshade is small, it can be precisely positioned to shade the eyes from direct sunlight in many different directions. The dual problem mentioned earlier is therefore resolved.

(6) In some preferred embodiments, the sunshade system has no moving parts. Moving parts may not be very reliable and a fast moving sunshade may seriously affect the safety of the occupants in the vehicle.

(7) In some preferred embodiments, unlike some prior sunshade systems requiring parts to be installed at awkward places inside or outside the vehicle, the sunshade system may not occupy any space normally accessible to the driver or passengers.

(8) In some preferred embodiments, the size of the sunshade may vary according to its distance from the eyes, the distance between the eyes, as well as other factors, so that its size is kept close to the minimum required to cast an umbra covering the eyes.

(9) The present invention also avoids many other limitations of the prior sunshade systems described before, such as requiring the driver to be seated at a fixed location, conducting a difficult research to come up with special tapering shapes, reentering the relative location of the sun from time to time, or ensuring exact geometric similarity among parts, etc.

These advantages, as well as some others will be clear with the following examples with more specific details.

EXAMPLE 1

We use FIG. 1 again to show an internal view of an automobile installed with an embodiment of the invention as an automatic sunshade system. Although this embodiment is practical, it is less preferred than the one in Example 2 for reasons that will be clear later. But it is presented because it is easier to describe the concept of this invention.

In this embodiment, the sunshade 9 is confined to move on a plane 15 approximately parallel to the windshield 8. This plane is hereafter in this example referred to as the shading plane. The sunshade can be moved to any position on the shading plane. During normal operation, it is always moved to the shading position 11, where the direct sunlight 12 to the eyes 14 crosses the shading plane.

Sunshade

Figure 7:
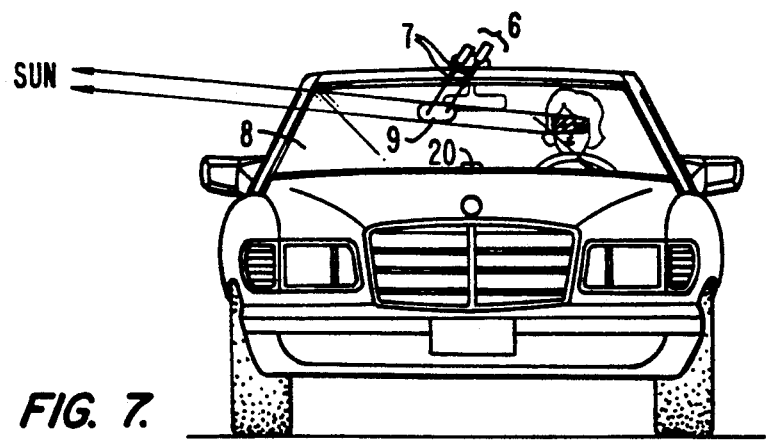
FIG. 7 shows the front view of an automobile in one embodiment of this invention.

Refer to FIG. 7, which shows an external view of the automobile with the same embodiment. The sunshade 9 is an opaque plate or a plate of a low transparency, supported by two arms 7 which are rotatable and extendable with motors 6.

Figure 8:
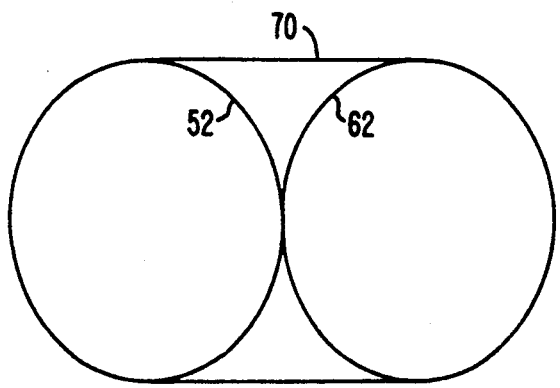
FIGS. 8 and 9 show the size and shape of the sunshade in one embodiment of the invention, viewed in different angles.
Figure 9:
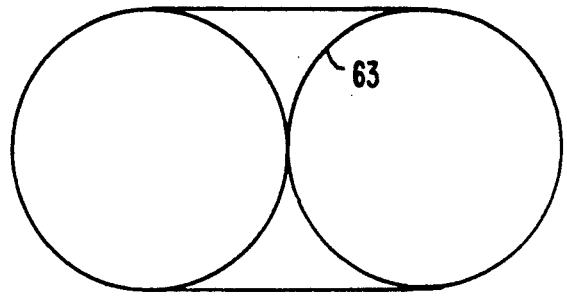

FIG. 8 shows an example of the sunshade design used in this embodiment. The size of the sunshade is fixed, and it has an approximately elliptical outline 70 about 6 inches long in the horizontal direction. The elliptical area 62 in this figure is more than enough to create an umbra shading the driver's left eye from direct sunlight. The other elliptical area 52 on the sunshade is used to shade the right eye. The length of the sunshade is chosen so that the distance between the centers of these two ellipses is about 3 inches, so that this sunshade can be used for drivers with a distance between the eyes up to about 3 inches. For a shading plane forming an angle about 30° from the vertical line, the width of the sunshade is about 3¼ inches. The width is chosen so that the projection of the sunshade on a plane perpendicular to the forward travel direction of the vehicle is about 3 inches wide, as shown in FIG. 9; and the projection of the elliptical area 62 (in FIG. 8) is an approximately round area 63 (in FIG. 9) about 3 inches in diameter.

Positioning the Sunshade

The arms supporting the sunshade are extended with the mechanism similar to what is commonly used to extend the telescoping "power antenna" on an automobile. Each arm is attached on one end to the sunshade and on the other end to a rotatable joint mounted on the roof of the automobile, close to the center of the top edge of the windshield. The arms are always rotated the same angle and extended the same length from the joint so that the bottom edge of the sunshade is always kept level.

A conventional feedback mechanism, such as one that uses a photodetector to track the rotation of a gear, may be employed to keep track of the displacement of the sunshade for the purpose of ensuring accurate positioning of the sunshade. Although the joint is mounted on the roof of the vehicle, if desired, it can be installed at other appropriate places, such as inside the vehicle behind the windshield.

The proposed mechanism for positioning the sunshade is only an example. Clearly, the sunshade may also be supported and moved by any other conventional mechanism, such as those that have been used by computer controlled x-y plotters. For simplicity of description, the software procedure MoveVisor PROCEDURE MoveVisor(oldX, oldY, newX, newY: REAL);

is used to represent any software routine known in the art which is used in cooperation with the particular mechanism of choice for positioning the sunshade in two dimensions at the desired position.

Although a PASCAL-like language is used here, the routine can be written in any other software language. Given the x,y-coordinates of the current and new positions of the sunshade on the shading plane, (oldX, oldY) and (newX, newY), respectively, this procedure moves the sunshade from the current (old) position to the new position. Although a Cartesian coordinate system is used here, a different type of coordinate system, such as polar, can of course be used if desired. In some implementation, a similar procedure may not require the coordinates of the old position as arguments.

Control Panel

Refer to FIG. 1. The sunshade system in this embodiment comprises a control panel 39. The control panel can be installed anywhere inside the automobile within easy reach of the driver in a normal driving position, such as on the inside wall of the left front door, or on the ceiling close to the driver, etc..

Figure 10:
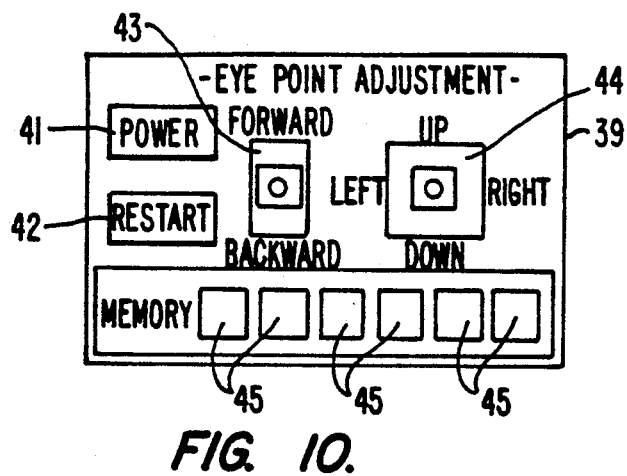
FIG. 10 shows the front view of a control panel in one embodiment of the invention.

FIG. 10 shows the front view of the control panel in more detail. There are switches 41, 42, 43, 44, and 45 on the panel. Switch 41 is the power switch for the sunshade system. Like a radio on many automobiles, the sunshade system is in operation only if switch 41 is turned to the on position and the electrical system of the vehicle is also turned on. In addition, to avoid interfering with the windshield wiper, the sunshade system does not operate if the windshield wiper is turned on. Thus if switch 41 is turned to the off position, the electrical system of the vehicle is turned off, or the windshield wiper is turned on, the sunshade system will stop operation. Before the system stops operation, it always moves the sunshade back to the "home position", e.g., the upper center of the windshield near the rear view mirror. The implementation of this feature and the use of the other switches will be explained later in this example.

Repositioning Means

The repositioning means comprises an electric circuit, which is connected to the source-tracking means and the motors that move the sunshade. The circuit may comprise a programmable device such as those in the microprocessor family. In this embodiment, it comprises a microprocessor executing a program. With the program, the microprocessor may compute the coordinates of the shading position based on the location of the target, the spatial information provided by the source-tracking means, the structure of the source-tracking means, and the known geometry of the shading plane; and send out appropriate driving signals to the motors to move the sunshade to the shading position, which is substantially in line with the sun and the target.

Also shown in FIG. 1 is the source-tracking means 20. The source-tracking means can be installed anywhere on the automobile where the sunlight to the source-tracking means is not obstructed, such as on the roof or behind the windshield 8. If desired, the source-tracking means may also be installed inside the dash board with an opening close to the windshield.

Figure 11:
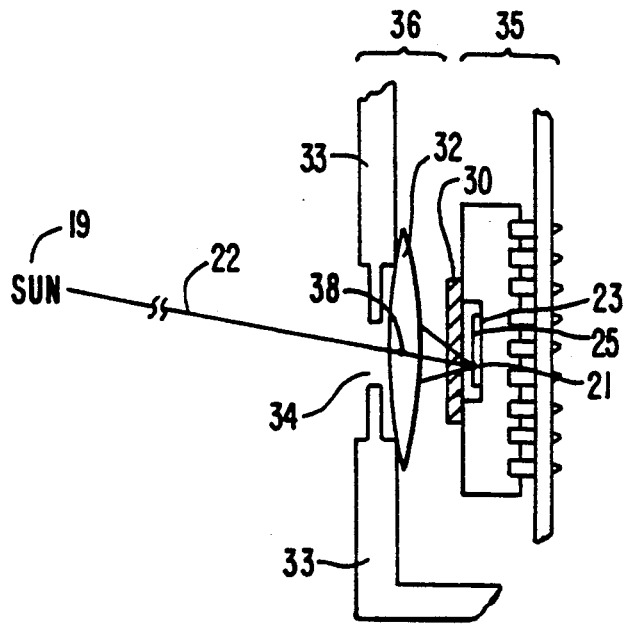
FIG. 11 shows the cross-sectional view of the source-tracking means in one embodiment of the invention.

FIG. 11 shows a cross-sectional view of the source-tracking means in this embodiment. It comprises a sensing means 35 and a varying means 36.

The sensing means comprises a sensing layer 23 sensitive to the sunlight in two dimensions so that the sunlight striking at different locations on the layer is separately responded, and the response to the sunlight at one location on the layer is identifiable from the response at the other locations on the layer. For simplicity of description, the collection of all the light sensitive sites on the layer is called the sensing surface 25. In this embodiment, the sensing means is a two-dimensional CCD, which comprises a two-dimensional matrix of light sensitive cells on the sensing layer.

The varying means causes an uneven distribution of the sunlight on the sensing layer. The distribution varies as a function of the location of the sun from the perspective of the source-tracking means. The varying means in this embodiment comprises a lens 32 and an enclosure 33 which has an aperture 34. The sensing means is enclosed inside the enclosure, so that the sunlight is prevented from reaching the sensing surface except when it passes through the aperture. The lens confines those rays of sunlight that pass through the aperture to strike at a limited number of the light sensitive cells in a small area on the sensing surface. For simplicity of description, the center point 21 of the small area where the sunlight strikes is called the point of incidence.

The sensing means and the varying means together form a line-finding means. It is so named because the point of incidence 21 and the optical center 38 of the lens determine a reference line 22, which passes through the sun 19 or a point close to the sun. With this embodiment, the determination of the reference line can be very precise. Many commercially available CCD's can support an angular resolution well within a fraction of a degree.

The enclosure can be made of any material that substantially obstructs the passage of the sunlight, such as wood, metal, opaque plastic, etc. Alternatively, if the aperture is substantially smaller than the size of the sensing surface, the sunlight passing through the aperture can also be confined to a small area on the sensing surface without a lens.

In this embodiment, a filter 30 is placed in front of the CCD to reduce the intensity of sunlight falling on the sensing surface. The filter is selected so that only direct sunlight passing through the filter can produce an amount of charge at the photon sensitive cells beyond a certain threshold value. The source-tracking means is fixed on the vehicle. In this embodiment, it is preferred that the rectangular sensing surface faces the forward direction of travel, with the longer edge of the rectangle being horizontal and the shorter edge being vertical.

Coordinate Systems

Figure 13:
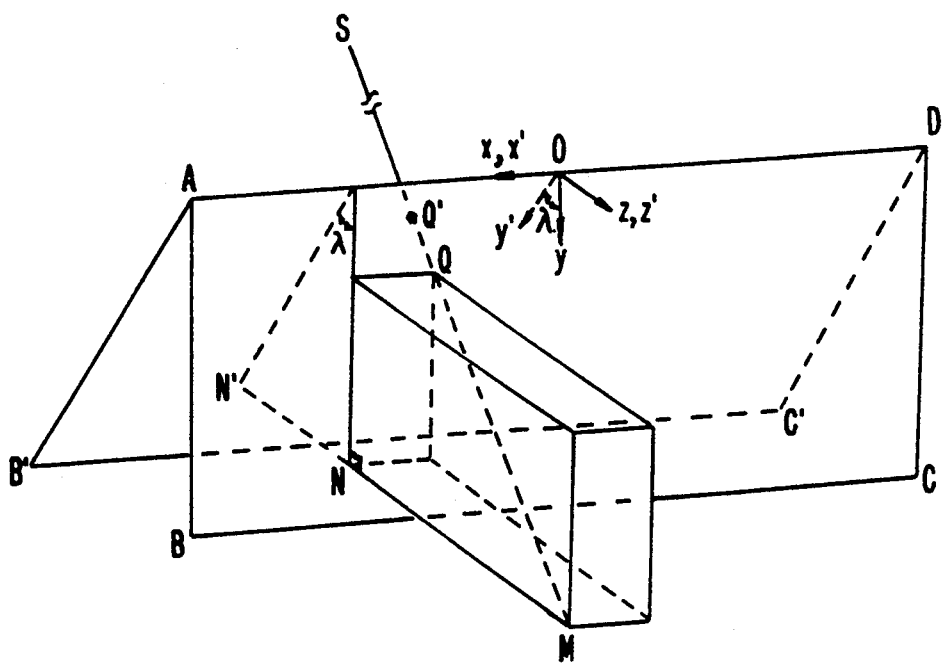
FIGS. 13 and 14 show the coordinate systems used in one embodiment of the invention.

Refer to FIG. 13. Plane ABCD represents a plane perpendicular to the vehicle's forward direction of travel. Plane AB'C'D represents the shading plane, on which the sunshade moves. The shading plane, being approximately parallel to the windshield, forms an angle $\lambda$ with the vertical plane ABCD. The direct sunlight emitted from the sun at point S to the target at M intersects with plane AB'C'D at point Q' and with plane ABCD at point Q. Thus point Q' should be the shading position. Note that we use a bold-faced letter to represent a point or a vector in space.

If the system is manufactured for a particular make and model of the automobile, the angle $\lambda$ is known, and it can be stored in a ROM (Read Only Memory). Of course, if the system is manufactured for general use, a number of $\lambda$'s for different makes and models of cars can be stored in the ROM and the appropriate $\lambda$ selected when we know which make and model the system is to be installed on.

Two coordinate systems are shown in FIG. 13, x-y-z and x'-y'-z'. Both systems share the same origin, point O, which is located at the center of the top edge of the windshield. In the x-y-z system, the x axis points to the left side of the vehicle, while the z axis points backwards. So the x-z plane is horizontal. The y axis vertically points down, forming a right angle with both the x and z axes. Thus plane ABCD is on the x-y plane. In the x'-y'-z' coordinate system, the x' and z' axes are the same as the x and z axes, respectively, but the y' axis is not the same as the y axis. The y' axis is perpendicular to the x' axis, but it forms an angle $\lambda$ with the y axis. Thus the shading plane, represented by plane AB'C'D, is on the x'-y' plane. The same unit of length is used in both systems.

For any point G in space with x,y,z-coordinates ($G_x$, $G_y$, $G_z$) and x',y',z'-coordinates ($G_{x'}$, $G_{y'}$, $G_{z'}$), we have $G_x = G_{x'}$. $G_{y'}$ is measured from this point to the x'-z' plane in the direction parallel to the y' axis. $G_{y'}$ is positive if and only if it is below the x'-z' plane. Similarly, $G_{z'}$ is measured from this point to the x'-y' plane in the direction parallel to the z' axis. Since the z' axis points to the rear, $G_{z'}$ is positive if and only if it is behind the x'-y' plane, i.e., on the driver's side.

If we draw a line parallel to the z axis from the target M to the front, the line would intersect with plane ABCD at point N and with plane AB'C'D at point N'. Let the x,y,z-coordinates of the target M be ($M_x$, $M_y$, $M_z$). The x,y,z-coordinates of points N and N' would be ($M_x$, $M_y$, 0) and ($M_x$, $M_y$, $-M_y \tan\lambda$), respectively; and the x', y', z'-coordinates of N' would be ($M_x$, $M_y \sec\lambda$, 0); where $\tan\lambda$ and $\sec\lambda$ are the tangent and secant of the angle $\lambda$, respectively. Note that these three points have the same x,y-coordinates.

Figure 14:
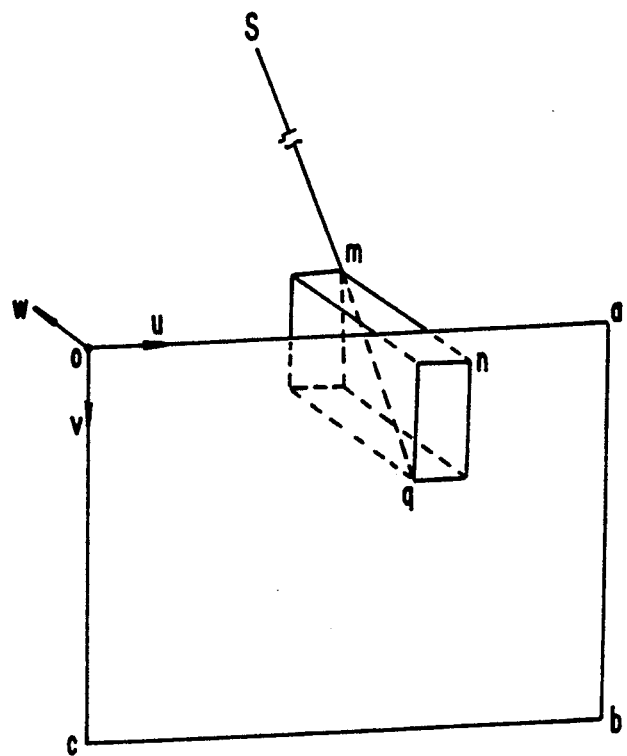

Refer to FIG. 14. The plane oabc represents the sensing surface. Point m is the optical center of the lens. Point q is the point of incidence of the sunlight passing through the aperture. Point S represents the sun or a point close enough to the sun for our purposes. Point o is at a corner of the sensing surface and is the origin of the u-v-w coordinate system. In this embodiment, as mentioned earlier, the sensing surface is perpendicular to the forward direction of travel with its longer edge being horizontal and the shorter edge vertical. The u axis is on the upper edge of the sensing surface pointing to the right. The w axis points forward. So the u-w plane is horizontal. The v axis is on a shorter edge of the sensing surface and it vertically points down, forming a right angle with both the u and w axes. Thus the sensing surface, represented by plane oabc, is on the u-v plane. For ease of description, the unit of length used in the u-v-w system is also the same as that used in the x-y-z and x'-y'-z' systems described previously.

If the sun is located straight ahead of the vehicle on the horizon, the sunlight passing through the aperture would strike at point n on the sensing surface. Let the u,v,w-coordinates of point m be ($m_u$, $m_v$, $m_w$). The u,v,w-coordinates of point n would be ($m_u$, $m_v$, 0).

Determining Optical Center

The coordinates of the optical center, point m ($m_u$, $m_v$, $m_w$), can be accurately determined using an artificial light source. The method is to send a beam of light to the line-finding means through the lens twice, in different but known directions. Each time we obtain the u,v-coordinates of the point of incidence, i.e., the center point of the area on the sensing surface where the beam strikes, by calling the GetPointOfIncid procedure, PROCEDURE GetPointOfIncid(VAR $incid_u$, $incid_v$: REAL);

which is described below. Then the coordinates of point m can be determined.

Using any method known in the art, the GetPointOfIncid procedure scans the light sensitive cells on the sensing surface to see which of them have been excited by the beam of light, i.e., accumulated an amount of charge beyond a threshold value. Then it returns the location of the center point of the cluster of excited sites. The location is returned through the variable parameters, $incid_u$ and $incid_v$, as the u,v-coordinates in the u-v-w coordinate system. The w-coordinate is not included because it is trivial. (Since the point of incidence is on the sensing surface, its w-coordinate must be 0.)

For example, we first send a horizontal beam of light from directly in front of the source-tracking means toward its lens, i.e., in the direction opposite that of the w axis. The beam would strike on the sensing surface at point n directly behind point m. Thus calling the GetPointOfIncid procedure with this horizontal beam of light turned on, we would obtain the u,v-coordinates of point n, $n_u$, and $n_v$, which are the same as $m_u$, and $m_v$, respectively.

$$m_u = n_u$$

$$m_v = n_v$$

Next we send another horizontal beam of light through the lens at an angle $\mu$ with the w axis and call the GetPointOfIncid procedure again. We obtain the u,v-coordinates of the new point of incidence, say, ($g_u$, $g_v$). Then $m_w$ would be equal to the distance between the two points of incidence divided by the tangent of angle $\mu$. Namely, $$m_w = ((n_u - g_u)^2 + (n_v - g_v)^2)^{\frac{1}{2}} / \tan\mu.$$

Once the source-tracking means is mounted on the vehicle, the coordinates of point m can be determined using this method and stored in the ROM. Knowing the location of point m, and the point of incidence q, the microprocessor may determine the reference line mq. Clearly, line mq passes the sun S or a point sufficiently close to the sun for our purposes.

Calibrating Means

In this embodiment, due to the distance of the sun, the reference line mq is essentially parallel to the direct sunlight SM to the target. The sunlight towards both of the driver's eyes are also essentially parallel. Therefore we may choose her left eye as the eyepoint and the ellipse 62 in FIG. 8 as the shading element. When the system correctly moves the shading element (i.e., ellipse 62) to shade the eyepoint (i.e., the left eye) from direct sunlight, the other ellipse 52 will also shade the right eye from direct sunlight. Clearly, we may choose the right eye as the eyepoint and the other ellipse 52 as the shading element; or choose the middle point of the two eyes as the eyepoint and the whole sunshade as the shading element for both eyes; the processing and accuracy will be virtually the same.

But whichever point we choose as the eyepoint, its location is different for drivers of different heights or in different placement of the driver's seat. The driver's head may also be moving from time to time. Hence the location of the eyepoint is not a constant. It would be very awkward and inaccurate to use a ruler to measure the coordinates of the eyepoint whenever it changes. It is also very cumbersome to manually input the coordinates to the system. Instead, we use the calibrating means to determine the eyepoint's location and automatically move the target to the determined location. The calibrating means may comprise some equipments known in the art which can automatically determine the location of an object, such as those generating and receiving acoustic or electro-magnetic waves. When the eyepoint changes frequently, the calibrating means may comprise means to dynamically determine the current location of the eyepoint and continuously update the location of the target with the current location of the eyepoint.

However, we may also do without using any of these wave generating equipments. Thus in this embodiment, the calibrating means only comprises a few electrical switches (42, 43, 44 in FIG. 10) connected to the circuit. With a very simple method, which will be described later, the eyepoint's location can be precisely determined in three dimensions and the target be moved to coincide with the eyepoint so determined.

Although the eyepoint's location may vary greatly for drivers of different stature in different placement of her seat, it is found that, for a particular driver in a particular placement of her seat, the eyepoint's location does not vary so much due to her head's movement during normal driving. As a matter of fact, the eyepoint's location may vary as much as one foot or more due to the difference in the driver's stature and the placement of the seat; but it may only vary a couple of inches or less due to her head's movement during travel, unless the driver significantly changes her poise or adjusts the placement of her seat. Hence once the eyepoint's location for a particular driver in a particular placement of her seat is determined, if the repositioning means keeps using the same location as the target in its computation, the sunshade design of FIG. 8, for example, will be adequate to always shade the eyes while allowing adequate room for the driver's head to move during travel. This room is wide enough to allow, for example, her head to moderately dance to the music. But even so, the sunshade of this particular design is still significantly small compared to conventional sunshades. Thus in this embodiment, for a driver in a particular placement of her seat, her eyepoint only needs to be determined once using the calibrating means, and there is no need for a special equipment to continuously remeasure and update her eyepoint's location all the time. Of course, if we reduce the range allowed for the head's movement or use a calibrating means which continuously remeasures and updates the eyepoint's location, the sunshade can be made smaller, even down to two coin-sized plates separated by a distance equaling that between the driver's eyes.

Computing Shading Position

In a normal mode of operation, the microprocessor continuously computes the coordinates of the shading position. Refer to FIG. 13 and 14. The computation depends on the following:

(1) The angle $\lambda$ between planes ABCD and AB'C'D. It is a constant and can be set by the installer when the sunshade system is installed on the vehicle.

(2) The location of the optical center of the lens m ($m_u$, $m_v$, $m_w$). It is also a constant. It can be determined using a method such as the one described previously and set by the installer once the source-tracking means is installed on the vehicle.

(3) The location of the point of incidence q ($q_u$, $q_v$, 0) on the sensing surface. It is a variable and can be obtained at any time by the microprocessor calling the GetPointOfIncid procedure.

(4) The location of the target M ($M_x$, $M_y$, $M_z$). It is also a variable. However, in this embodiment, it remains unchanged until the driver adjusts it with the calibrating means or restores a location previously saved. The target's coordinates are held in the memory accessible by the microprocessor.

Whether the target's location is the same as the eyepoint's or not, the microprocessor always computes the shading position based on the current coordinates of the target, i.e., the current values for $M_x$, $M_y$, and $M_z$ being held in the memory. The microprocessor computes the x',y'-coordinates ($Q'_{x'}$, $Q'_{y'}$) of the shading position Q' by finding the coordinates of the intersection of the shading plane with a line which contains the target M and is parallel to the reference line mq, as follows:

$$Q'_x = M_x - td_x \quad (1.1)$$

$$Q'_y = (M_y - td_y)\sec\lambda \quad (1.2)$$

where $t = (M_z + M_y \tan\lambda)/(d_z + d_y \tan\lambda)$; $\sec\lambda$ and $\tan\lambda$ are the secant and tangent of $\lambda$, respectively; and $d_x$, $d_y$, and $d_z$ are a set of direction numbers of the reference line in the x-y-z coordinate system, namely, $$d_x = m_u - q_u \quad (1.3)$$

$$d_y = q_v - m_v \quad (1.4)$$

$$d_z = m_w \quad (1.5)$$

Note that the z'-coordinate of the shading position Q', $Q'_z$, is always 0.

Global Variables

A software program comprising the AutoVisor procedure, which makes use of the above formulae, is executed by the microprocessor. The AutoVisor procedure may reference the following global variables:
$m_u$, $m_v$, $m_w$, $M_x$, $M_y$, $M_z$, $\tan\lambda$, $\sec\lambda$: REAL;
operating, normalMode: BOOLEAN;
where ($m_u$, $m_v$, $m_w$) are the u,v,w-coordinates of point m, the optical center of the lens; ($M_x$, $M_y$, $M_z$) are the x,y,z-coordinates of the target M; $\tan\lambda$ and $\sec\lambda$ are the tangent and secant of the angle $\lambda$ between the vertical plane ABCD and the shading plane represented by plane AB'C'D; and 'operating' and 'normalMode' are two boolean flags which will be described later.

When the electrical system of the vehicle is turned on, the windshield wiper is not turned on, and switch 41 is turned on, the power to the sunshade system is turned on. When the power to the sunshade system is just turned on, the values for the 'operating' and 'normalMode' variables are set to true, and the AutoVisor procedure is invoked.

Operation of AutoVisor Procedure

Figure 24:
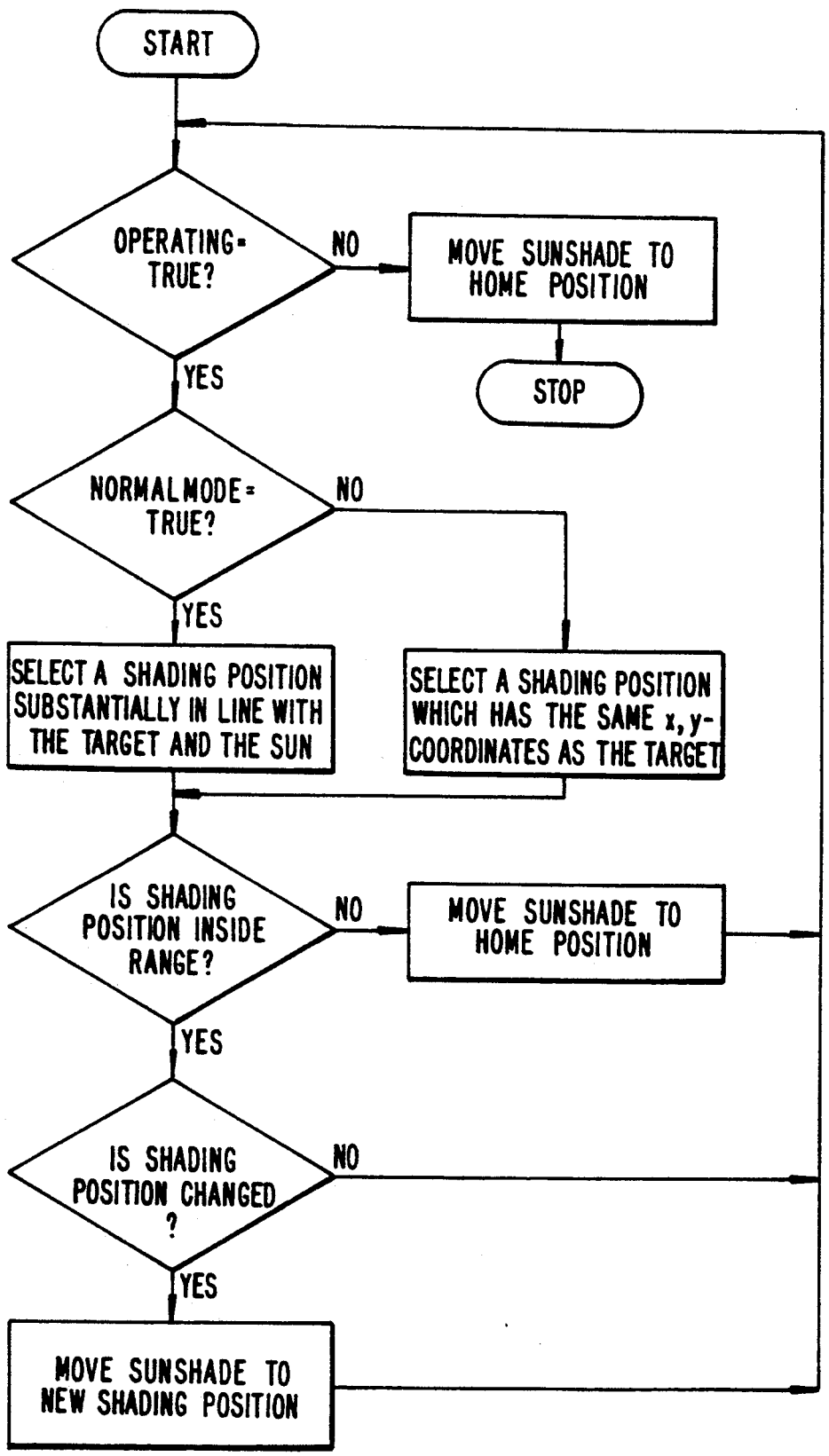
FIG. 24 is the flowchart of the Auto Visor procedure.

An example of the AutoVisor procedure is shown in FIG. 23. Its flowchart is shown in FIG. 24. The AutoVisor procedure is written in a PASCAL-like language in which characters of different fonts and styles may be used in variables' names. As long as the 'operating' variable remains true, the AutoVisor procedure remains in a loop of operations. What it does in each loop depends on the value of the 'normalMode' flag, as described below.

Refer to FIGS. 13 and 14. When 'normalMode' is true, AutoVisor operates in the "normal" mode, in which AutoVisor first calls the GetPointOfIncid procedure to get the u,v-coordinates of the point of incidence q. Recall that points q and m determine the reference line mq. With these coordinates, the AutoVisor procedure computes the x',y'-coordinates of the shading position Q' according to formulae (1.1) to (1.5), and calls the MoveVisor procedure to move the sunshade to the shading position.

If 'normalMode' is false, AutoVisor operates in a "special" mode called the '$M_x$-$M_y$ setting' mode, in which it calls the MoveVisor procedure to move the sunshade to point N' on the shading plane straight in front of the target M. The x'-y'-z' coordinates of point N' are ($M_x$, $M_y \sec\lambda$, 0). Recall that the x- and y-coordinates of point N' are $M_x$ and $M_y$, respectively. So in this mode, if the target is moved so that the driver sees the sunshade positioned straight in front of her at the same height as her eyes, both the target and the sunshade will have the same x,y-coordinates as those of the eyepoint.

When the sunshade system is in operation, if the electrical system of the vehicle is turned off, switch 41 is turned off, or the windshield wiper is turned on, the value for the 'operating' variable is set to false, and the power to the system remains on for a short while before it is actually turned off. The length of time that the power is kept on is enough for the AutoVisor procedure to get out of the loop of operations and move the sunshade back to the "home position," point O, on the shading plane.

Determining Eyepoint

Refer to FIG. 10. As mentioned earlier, the calibrating means in this embodiment comprises switches 42, 43, and 44 connected to the circuit. With these switches, we may use the two-step method described below to determine the coordinates of the eyepoint and update the coordinates of the target M ($M_x$, $M_y$, $M_z$) with the eyepoint's coordinates so determined.

Step 1. Adjusting $M_x$ and $M_y$

Switch 44 is used to find the x,y-coordinates of the eyepoint and update $M_x$ and $M_y$. It does not matter whether $M_z$ is holding the correct z-coordinate of the eyepoint or not. If this switch is pushed to the right (or left) once then released, the value for $M_x$ in the memory is increased (or decreased) by a small amount. Similarly, if it is pushed up (or down) once then released, the value for $M_y$ is increased (or decreased) by a small amount. In fact the switch can be pushed to any directions, such as upper right to increase the values for both $M_x$ and $M_y$ at the same time, or upper left to decrease the value for $M_x$ and increase that for $M_y$ at the same time, etc. Much like the "Auto Repeat" feature supported by many conventional computer systems, if this switch is pushed and held in one direction for more than a couple of seconds, the value(s) for the corresponding variable(s) is(are) continuously increased or decreased in a faster paste until the switch is released.

In any case, once switch 44 is pushed, the variable 'normalMode' is set to false and it remains false until switches 42 or 43 is pushed. Because of the way AutoVisor is designed, as listed in FIG. 23, if the driver pushes switch 44, she will see that the sunshade system of this embodiment stops its normal mode of operation, i.e., the sunshade no longer follows the sun. Instead, the sunshade is moved step by step or continuously according to the way she pushes switch 44 to adjust the values for $M_x$ and $M_y$.

In short, to find the x,y-coordinates of the eyepoint and update $M_x$ and $M_y$ accordingly, what the driver needs to do is simply to push switch 44 until the sunshade is moved to a position straight in front of, and at the same height as, her eyes. When the sunshade is so positioned, $M_x$ and $M_y$ should be the same as the x- and y-coordinates, respectively, of the eyepoint.

After doing so, the driver may push switch 42 or 43, turning the value of the 'normalMode' flag to true, so that the AutoVisor procedure resumes its normal mode of operation, using the current $M_x$, $M_y$ and $M_z$ to compute the shading position. In this mode, with $M_x$ and $M_y$ the same as the x,y-coordinates of the eyepoint, if the sunshade happens to correctly shade the eyepoint, the current $M_z$ is just right, i.e., the same as the z-coordinate of the eyepoint, and there will be no need for the next step. Otherwise, the driver may proceed to the next step to find the correct z-coordinate of the eyepoint and update $M_z$ accordingly.

Step 2. Adjusting $M_z$

If switch 43 is pushed up (or down) once then released, the value for $M_z$ is increased (or decreased) by a small amount. If the switch is pushed and held in one direction for more than a couple of seconds, $M_z$ is continuously increased or decreased in a faster paste until the switch is released. Because the way AutoVisor is designed, pushing this switch one way or the other, the driver will see that the sunshade is moved toward or away from the sun in her view.

In short, to find the z-coordinate of the eyepoint and update $M_z$ accordingly (after $M_x$ and $M_y$ are updated with the x,y-coordinates of the eyepoint using step 1), the driver simply pushes switch 43 up or down until the sunshade correctly shades the eyepoint from direct sunlight.

Thus the calibrating means in this embodiment comprises means (switches 43 and 44) for moving the target, means (switch 44) for switching the device to the "$M_x$-$M_y$ setting" mode, and means (switch 42 or 43) for switching the device back to the normal mode. Using the calibrating means and the surprisingly simple two-step method described above, we may easily and accurately determine the location of the eyepoint and move the target to coincide with the eyepoint, without the need to directly measure the eyepoint's coordinates using a ruler and manually input the coordinates to the system.

It is worth mentioning that in either step 1 or step 2 above, the system provides very clear visual feedback for the user. In step 1, when $M_x$ and $M_y$ are the same as the x,y-coordinates of the eyepoint, the user will see that the sunshade is straight in front of her at the same height as her eyes. It is especially unique in step 2. When $M_z$ is adjusted to be the same as the z-coordinate of the eyepoint, the user will see that the sunshade exactly shades her eyes from direct sunlight.

Saving and Restoring Eyepoint

The coordinates of the target, which may be the same as those of the eyepoint determined by the calibrating means, can be saved in a less volatile memory, such as a RAM powered by a battery, so that they can be restored later. Thus the coordinates of the eyepoints for different drivers in different placement of the driver's seat can be saved and restored electronically using switches 45 (FIG. 10) at any time in much the same way as saving and restoring preselected frequencies for radio stations. When the embodiment is first installed on the vehicle, default coordinates of the eyepoint are saved in the memory for every one of the switches 45. The default coordinates can be, for example, the eyepoint's coordinates for a driver of an average height in a certain normal placement of the driver's seat. The default coordinates are provided so that it will be easy for any driver to locate her eyepoint using the calibrating means.

The location of the target, as represented by the values of $M_x$, $M_y$, and $M_z$ in the memory, remains unchanged until they are changed by step 1 or 2 above or the driver pushes one of the switches 45. After the two-step method described above, the driver can save the values for $M_x$, $M_y$, and $M_z$, by pushing one of the switches 45 and hold it down for a couple of seconds. Next time she drives the car, if the values for $M_x$, $M_y$, and $M_z$ are changed by someone else, she can push this switch to restore a set of values for $M_x$, $M_y$, and $M_z$ that she previously saved.

Variation of Control Panel

Although either $M_x$, $M_y$, or both, can be adjusted by pushing switch 44, most of the time this switch is used to adjust $M_y$ only, because in a conventional automobile the driver's seat does not move sideways, and hence every driver's eyepoint should have about the same x-coordinate. Therefore, if desired, we may simplify this switch to only adjust $M_y$, and let $M_x$ be preadjusted by the installer or manufacturer of the system using a hidden switch.

Figure 12:
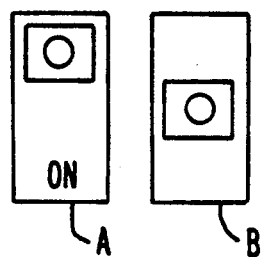
FIG. 12 shows a different design of some switches on a control panel.

The arrangement and style of the switches in FIG. 10 is only an example. There can be many variations to serve the same purposes. For another example, in cases where $M_x$ is preadjusted by the installer or manufacturer of the system, switches 41, 42, 43 and 44 can be replaced by only two switches, A and B, as shown in FIG. 12. Switch A can be pushed and stay in one of three positions: top, middle, and bottom. Switch B can be pushed up or down, but it always automatically comes back to the middle position when it is not pushed.

If switch A is pushed to the middle position, the sunshade system of this embodiment is turned on but it operates in the "$M_y$ setting" mode, in which the user can push switch B up or down to increase or decrease the value for $M_y$.

If switch A is pushed to the top position, the power is still on and the system works in the normal mode. In this mode, switch B can be used as switch 43 described previously to adjust $M_z$ if needed.

If switch A is pushed to the bottom position, the power is turned off.

EXAMPLE 2

This example describes another embodiment of the invention. It employs a different king of shading element. Instead of a solid plate, the shading element is formed by liquid crystals. The other parts of this embodiment are similar to what is described in Example 1. The differences will be noted in the description that follows.

Sunshade

A two dimensional matrix of liquid crystal cells are laid on the windshield, similar to the black-and-white LCD (Liquid Crystal Display) screen of a conventional portable computer which is capable of displaying raster graphics. Alternatively, the liquid crystal cells can be made on a piece of glass, or a different type of substrate, rigid or flexible, which is separate from the windshield. The cells are transparent in their normal state and can be selectively turned less transparent to block the sunlight or reduce the transmittance of light through them. In other words, the sunshade in this embodiment is formed by the liquid crystal cells in the area where some or all of the cells are turned less transparent. Since the liquid crystal cells are laid on the windshield, the sunshade is confined to move on the curved surface of the windshield. The surface of the windshield is called hereafter in this example the shading surface. Similar to Example 1, the shading position is computed by finding the intersection of the shading surface with the line containing the target and parallel to the reference line, which is determined with the information provided by the source-tracking means.

Figure 15:
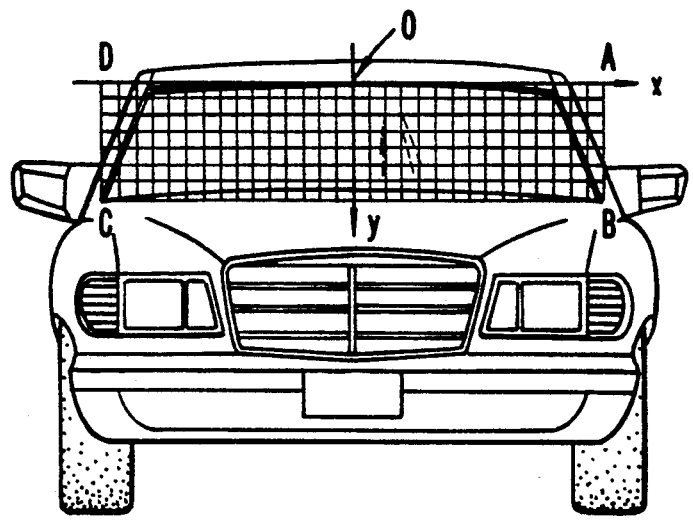
FIG. 15 shows the front view of an automobile in one embodiment of the invention having liquid crystal cells laid on the windshield.

Refer to FIG. 15, which shows the front view of an automobile. Here we use a coordinate system in which the origin O is the center of the top edge of the windshield, the x axis horizontally points to the right (i.e., towards the left of the vehicle), the y axis vertically points down, and the z axis points into the page (i.e., towards the rear of the vehicle). The unit of length is inch.

Imagine a 30 by 7 matrix of square meshes ABCD on the x-y plane (where z=0), comprising 31 vertical and 8 horizontal grid lines. Each square is about 2 inches wide. The overall size of the matrix of meshes is chosen so that, if we project the matrix of meshes along the negative-z direction to the windshield, the whole windshield is enclosed inside its boundary. For ease of description, we extend the windshield by imagination, following its curvature, so that every mesh has a projection on the (extended) windshield. The projection of the meshes, grid lines, and grid points on the extended windshield are also called the meshes, grid lines, and grid points, respectively, for ease of description.

Figure 16:
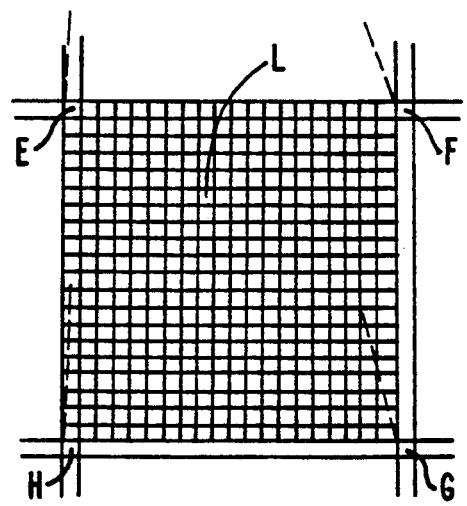
FIG. 16 shows a layout of the liquid crystal cells in a small area on the windshield, viewed from straight ahead of the vehicle.

Many different layout and density of the liquid crystal cells can be used. The layout and density in this embodiment is such that there are 20 by 20 cells in the projection of each mesh on the windshield, as illustrated in FIG. 16 for one of the meshes. Thus the x,y-coordinates for the grid points E, F, G, and H, for example, are (4, 4), (6, 4), (6, 6), and (4, 6), respectively, in terms of inches.

The method to set liquid crystal cells in a selected area to be transparent or less so has been well known in the art. For example, we may use a display controller chip which sets the degree of transparency for the cells according to a bitmap in the RAM. A cell is turned to be transparent or less so if its corresponding bit in the RAM is 0 or 1, respectively. The bits are set to 1 or reset to 0 by the microprocessor calling the MoveVisor2 procedure, PROCEDURE MoveVisor2(visor$_x$, visor$_y$: REAL);

where (visor$_x$, visor$_y$) are the x,y-coordinates of the position of the sunshade. In this embodiment, we also take the middle point between the driver's eyes as the eyepoint, and the shading position is computed in terms of the center point of the sunshade. Thus in the normal mode of operation, the sunshade is moved to be centered at the shading position to shade the eyepoint. Instead of driving motors to move the sunshade as the MoveVisor procedure in Example 1, the MoveVisor2 procedure here sets those bits in the RAM corresponding to the new sunshade area to 1 after resetting all bits in the bitmap to 0. The display controller then reflects this change on the windshield so that the sunshade appears to be moved from the old position to the new.

Unlike the embodiment in Example 1, there is no need to move the sunshade back to a home position when the shading position is outside some range, the power to the sunshade system is turned off, or the windshield wiper is turned on. When the shading position is outside or close to the edge of the windshield, the sunshade may be partially visible or completely out of sight, depending on how far the sunshade's position is away from the edge of the windshield. When the power to the sunshade system is turned off, we may simply turn all the liquid crystal cells to be transparent. When the windshield wiper is turned on, the sunshade system of this embodiment may remain in operation, because in this embodiment the sunshade and the windshield wiper don't interfere with each other. (Although we usually don't need a sunshade in a rainy day.)

Figure 17:
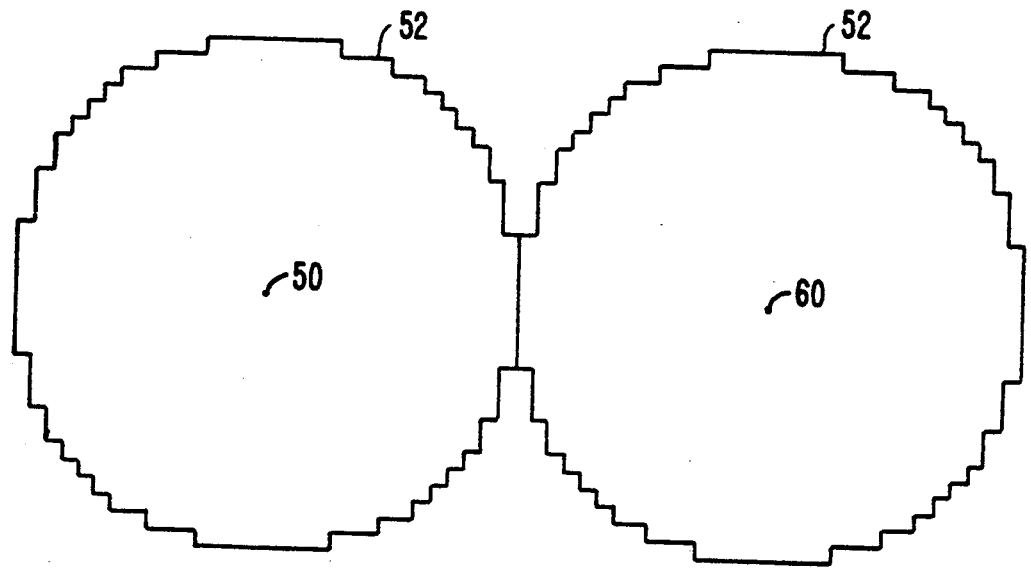
FIG. 17 shows the outline of a design of the sunshade formed by liquid crystal cells.

Many different sizes and shapes of the sunshade area can work. FIG. 17 shows one example. Viewed along the z direction, this design comprises two approximately round areas (52 and 62) about 3 inches in diameter and their centers (50 and 60) are separated by about 3 inches.

Figure 18:
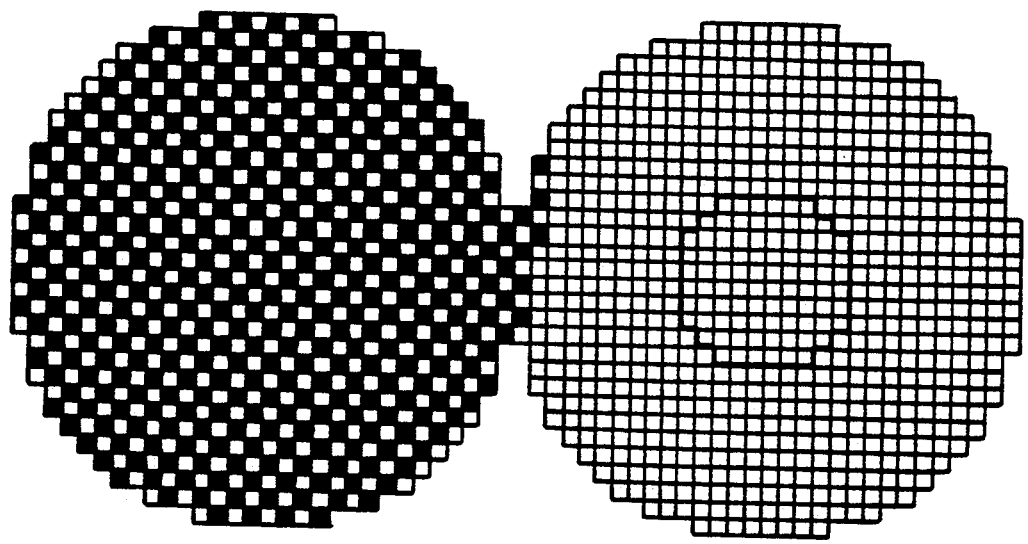
FIG. 18 shows a gray pattern that may be used with the design of FIG. 17.

This embodiment can easily support many optional features. For example, there may be an additional nob on the control panel to adjust the distance between the centers 50 and 60 to match the distance between the driver's eyes. There may also be an additional nob to adjust the size of the round areas 52 and 62. Alternatively, the microprocessor may automatically vary the size of the areas 52 and 62 depending on the distance of the sunshade from the target, so that the sunshade would be larger when it is farther away, and smaller when it is closer to the target. The liquid crystal cells in the sunshade area may be set in different grey patterns. FIG. 18 shows an example of the grey patterns that may be used. If desired, the cells may also be set at different gray levels, i.e., different percentage of light transmitted through the cells.

Determining Optical Center and Orientation of CCD

Recall that in Example 1 the rectangular sensing surface of the CCD is oriented perpendicular to the forward direction of travel, with the longer edge of the sensing surface being horizontal and the shorter edge vertical. The more accurate we want the embodiment of Example 1 to work, the more accurate we must orient the sensing surface, i.e., a more careful adjustment is required when the source-tracking means is installed on the vehicle. However, in the embodiment of this example (i.e., Example 2), the sensing surface does not have to be so accurately oriented when it is installed, i.e., its surface does not have to be exactly perpendicular to the forward direction and its edges do not have to be exactly horizontal or vertical, because we can calibrate its orientation using the method described below.

Figure 19:
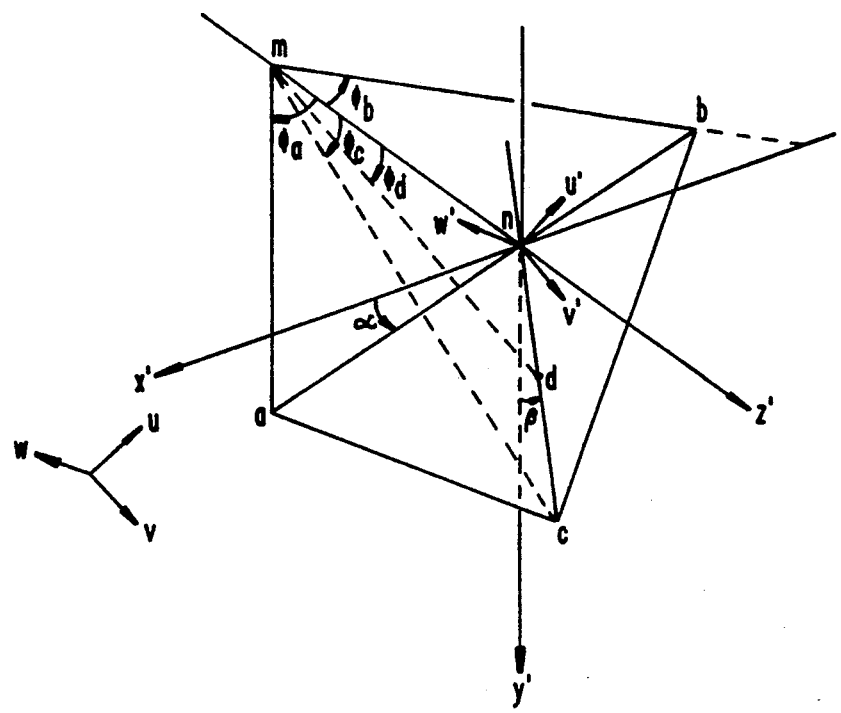
FIG. 19 illustrates the spatial relation among four beams of light which go through the aperture and strike on the sensing surface of a source-tracking means in one embodiment of the invention.

Refer to FIG. 19. The x', y', and z' axes in this figure are parallel to the x, y, and z axes, respectively, that are illustrated in FIG. 15. The z' axis passes through the optical center of the lens point m. The origin of the x'-y'-z' coordinate system is located at point n, where the z' axis crosses the sensing surface. Another coordinate system, u-v-w, is shown in FIG. 19. Its origin is located at a corner of the rectangular sensing surface. The u axis is on the longer edge, the v axis is on the shorter edge, and the w axis is perpendicular to the sensing surface. For simplicity of description, we use inch as the unit of length in all these three coordinate systems. Although the source-tracking means is installed such that the w axis is approximately pointing in the forward travel direction, the u axis is approximately horizontal, and the v axis is approximately vertical, they may not be exactly so.

After the source-tracking means is installed on a vehicle, to find out the exact orientation of the sensing surface and the location of the optical center relative to the sensing means, we use an artificial light source to send a beam of light towards the source-tracking means four times in different but known directions. For example, first we send a horizontal beam toward the aperture at an angle $\phi_a$ with the z axis. As shown in FIG. 19, this beam of light strikes on the sensing surface at point a. Since the z' axis is parallel to the z axis, the angle between the line ma and the z' axis is also $\phi_a$. Knowing that the w-coordinate for every point on the sensing surface is 0, we use the same GetPointOfIncid procedure as described in Example 1 to find the u,v-coordinates, $a_u$ and $a_v$, for the point of incidence, point a, of this beam on the sensing surface. Next we send another horizontal beam toward the aperture at an angle $\phi_b$ with the z axis. This second beam of light strikes on the sensing surface at point b. We call the GetPointOfIncid procedure again to find the u,v-coordinates for point b, $b_u$ and $b_v$. Then we send a third beam to the aperture. This beam travels on a plane parallel to the y-z plane at an angle $\phi_c$ with the horizontal plane. As shown in the figure, this beam travels on the y'-z' plane and strikes on the sensing surface at point c, whose u,v-coordinates are found to be $c_u$ and $c_v$. Lastly, we send a fourth beam of light which also travels on the y'-z' plane but at an angle $\phi_d$ with the horizontal plane. It strikes on the sensing surface at point d, whose u,v-coordinates are found to be $d_u$ and $d_v$.

As shown in FIG. 19, line ab must cross line cd at point n. The u,v-coordinates for point n, $n_u$ and $n_v$, can be derived from the coordinates of points a, b, c, and d. Namely, $$n_u = [(a_u b_v - a_v b_u)(c_u - d_u) - (c_u d_v - c_v d_u)(a_u - b_u)]/[-(a_u - b_u)(c_v - d_v) - (a_v - b_v)(c_u - d_u)] \quad (2.1)$$

$$n_v = [(a_u b_v - a_v b_u)(c_v - d_v) - (c_u d_v - c_v d_u)(a_v - b_v)]/[(a_u - b_u)(c_v - d_v) - (a_v - b_v)(c_u - d_u)] \quad (2.2)$$

For simplicity of description, let $a = |a - n|$, or in other words, let the normal-faced letter "a" represent the distance between point a and point n. Also let $b = |b - n|$, $c = |c - n|$, $d = |d - n|$, and $m = |m - n|$. Since the u,v-coordinates for points a, b, c, d, and n are now known, we can obtain the values for a, b, c, and d. For example, $a = ((a_u - n_u)^2 + (a_v - n_v)^2)^{\frac{1}{2}}$.

As shown in FIG. 19, assume line ab forms an angle $\alpha$ with the x'-y' plane and line cd forms an angle $\beta$ with the x'-y' plane. We can obtain the values for $\alpha$, $\beta$, and m as follows.

$$\alpha = \text{Arctan}((a/\tan\phi_a - b/\tan\phi_b)/(a+b)) \quad (2.3)$$

$$m = a \cos(\phi_a + \alpha)/\sin\phi_a \quad (2.4)$$

$$\beta = \text{Arccos}(m \sin\phi_c/c) \quad (2.5)$$

The coordinates for points a, b, c, d, m, and n in the x'-y'-z' coordinate system can now be expressed in terms of the values a, b, c, d, m, $\alpha$ and $\beta$, as listed in Table 2.1.

TABLE 2.1

| point | x',y',z'-coordinates |
|---|---|
| a | (a cos α, 0, a sin α) |
| b | (−b cos α, 0, −b sin α) |
| c | (0, c cos β, c sin β) |
| d | (0, d cos β, d sin β) |
| m | (0, 0, −m) |
| n | (0, 0, 0) |

Determining Point of Incidence

For simplicity of description, we add a u'-v'-w' coordinate system in which the origin is point n and the u', v', and w' axes are parallel to the u, v, and w axes, respectively, as shown in FIG. 19. The coordinates for points in the u'-v'-w' coordinate system are a simple translation from their coordinates in the u-v-w system. Specifically, for any point g with u,v,w-coordinates ($g_u$, $g_v$, $g_w$) and u',v',w'-coordinates ($g_{u'}$, $g_{v'}$, $g_{w'}$), we have $g_{u'} = g_u - n_u$, $g_{v'} = g_v - n_v$, and $g_{w'} = g_w$.

Let i, j, and k be the unit vectors in the x, y, and z directions; and let u, v, and w be the unit vectors in the u, v, and w directions. Assume that $u = u_x i + u_y j + u_z k$ and $v = v_x i + v_y j + v_z k$. Since $a = a_{u'} u + a_{v'} v$ and $c = c_{u'} u + c_{v'} v$ in the u'-v'-w' system, we have $$u_x = a c_{v'} \cos\alpha/(a_{u'} c_{v'} - a_{v'} c_{u'}) \quad (2.6)$$

$$u_y = -c a_{v'} \cos\beta/(a_{u'} c_{v'} - a_{v'} c_{u'}) \quad (2.7)$$

$$u_z = (a c_{v'} \sin\alpha - c a_{v'} \sin\beta)/(a_{u'} c_{v'} - a_{v'} c_{u'}) \quad (2.8)$$

$$v_x = -a c_{u'} \cos\alpha/(a_{u'} c_{v'} - a_{v'} c_{u'}) \quad (2.9)$$

$$v_y = c a_{u'} \cos\beta/(a_{u'} c_{v'} - a_{v'} c_{u'}) \quad (2.10)$$

$$v_z = (c a_{u'} \sin\beta - a c_{u'} \sin\alpha)/(a_{u'} c_{v'} - a_{v'} c_{u'}) \quad (2.11)$$

Figure 20:
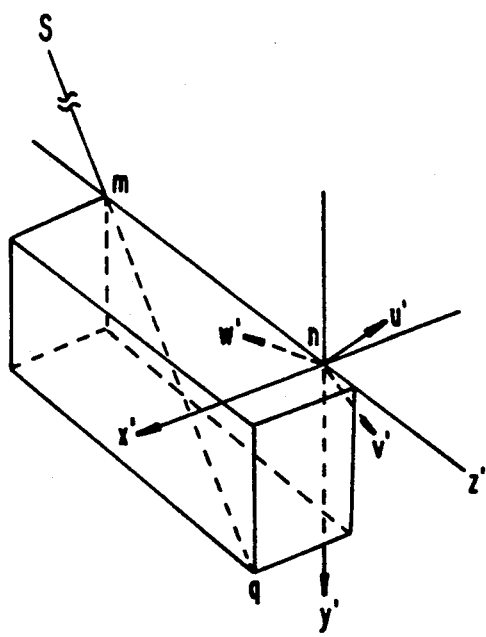
FIG. 20 illustrates the spatial relation of a reference line with the coordinate systems used in one embodiment of the invention.

Refer to FIG. 20. For any beam of sunlight that shines through the lens and hits the sensing surface at a point of incidence q, the x', y', z'-coordinates for point q ($q_{x'}$, $q_{y'}$, $q_{z'}$) can be obtained by first calling the GetPointOfIncid procedure to get its u,v-coordinates, $q_u$ and $q_v$, respectively, then using the following conversion equations:

$$q_{x'} = q_{u'} u_x + q_{v'} v_x \quad (2.12)$$

$$q_{y'} = q_{u'} u_y + q_{v'} v_y \quad (2.13)$$

$$q_{z'} = q_{u'} u_z + q_{v'} v_z \quad (2.14)$$

where $q_{u'} = q_u - n_u$ and $q_{v'} = q_v - n_v$.

Global Variables

The AutoVisor2 procedure is basically the same as AutoVisor in Example 1 but somewhat more complicated in its computation, as will be described later. It references the following global variables:

$M_x$, $M_y$, $M_z$: REAL;
m, $n_u$, $n_v$, $u_x$, $u_y$, $u_z$, $v_x$, $v_y$, $v_z$: REAL;
$g_x$: ARRAY [0 ... 30] OF REAL;
$g_y$: ARRAY [0 ... 7] OF REAL;
$g_z$, $gd_x$, $gd_y$: ARRAY [0 ... 7] OF ARRAY [0 ... 30] OF REAL;
normalMode: BOOLEAN;

The meanings of these variables are described as follows:

$M_x$, $M_y$, and $M_z$ are the x,y,z-coordinates of the target M. In this embodiment, the coordinates for the eyepoint are determined, and the target's coordinates are updated accordingly, in the same two-step method as described in Example 1. Namely, first use switch 44 (FIG. 10) to adjust the values for $M_x$ and/or $M_y$. The AutoVisor2 procedure automatically moves the sunshade to a point on the windshield having the same x,y-coordinates as the target ($M_x$, $M_y$). When the sunshade is moved to a point directly in front of the driver at the same height as the her eyes, ($M_x$, $M_y$) would be the same as the x,y-coordinates of her eyepoint. After finding the correct $M_x$ and $M_y$, press switch 42 (or 43) to resume the normal operation of the sunshade system. If the sunshade does not correctly block the sun at this time, use switch 43 to adjust $M_z$ until the sunshade correctly shades the eyepoint.

Refer to FIG. 19. m is the distance between points m and n computed with formula (2.4). $n_u$ and $n_v$ are the u,v-coordinates of point n computed with formulae (2.1) and (2.2). $u_x$, $u_y$, $u_z$, $v_x$, $v_y$ and $v_z$ are the x,y,z-components of the unit vectors u and v computed with formulae (2.6) through (2.11). These values are computed and stored in the ROM after we calibrate the orientation of the sensing surface using the four-beam method described previously.

$g_x$, $g_y$, and $g_z$ are arrays to store the x,y,z-coordinates for the grid points. The coordinates are known characteristics of the vehicle on which the sunshade system is installed. In this particular embodiment, there are only 31 different x-coordinates and 8 different y-coordinates for the grid points. The x-coordinates are stored in the $g_x$ array and the y-coordinates in the $g_y$ array. Namely, $g_x[0]=-30$, $g_x[1]=-28$, ..., $g_x[30]=30$; and $g_y[0]=0$, $g_y[1]=2$, ..., $g_y[7]=14$. The z-coordinates for the grid points on the windshield can be measured and stored in the two dimensional array $g_z$ such that $g_z[i][j]$ stores the z-coordinate of the grid point where the i-th horizontal grid line on the windshield crosses the j-th "vertical" grid line on the windshield. The horizontal grid lines on the windshield are indexed from top to bottom starting from 0. The "vertical" grid lines on the windshield are indexed from left to right, also starting from 0. For example, the z-coordinate for the projection of the grid point D (FIG. 15) on the windshield is stored as $g_z[0][0]$, and that for the projection of point B on the windshield is stored as $g_z[7][30]$. The z-coordinate measurement for all the grid points on the windshield may be done only once (e.g., by the installer or manufacturer) for a particular make and model of the vehicle.

The x,y,z-coordinates for (the center point of) any liquid crystal cell on the windshield can be obtained from the x,y,z-coordinates of three grid points on the windshield adjacent to the cell, assuming that the windshield surface in each mesh is flat. Due to the small size of the meshes, this assumption is accurate for our purposes. For example, let the mesh in FIG. 16 represent a typical mesh on the windshield with the x,y,z-coordinates for the grid points E, F, G, and H being ($E_x$, $E_y$, $E_z$), ($F_x$, $F_y$, $F_z$), ($G_x$, $G_y$, $G_z$), and ($H_x$, $H_y$, $H_z$), respectively. Note that in this embodiment $E_x=H_x$, $F_x=G_x$, $E_y=F_y$, and $H_y=G_y$. The x-coordinate for point L, which is in the eighth column of cells to the right of the cell at point E, is $(12E_x+8F_x)/20$. Similarly, the y-coordinate for point L, which is in the fifth row of cells below the cell at point E, is $(15E_y+5H_y)/20$. And the z-coordinate for point L is $(7E_z+8F_z+5H_z)/20$.

Figure 21:
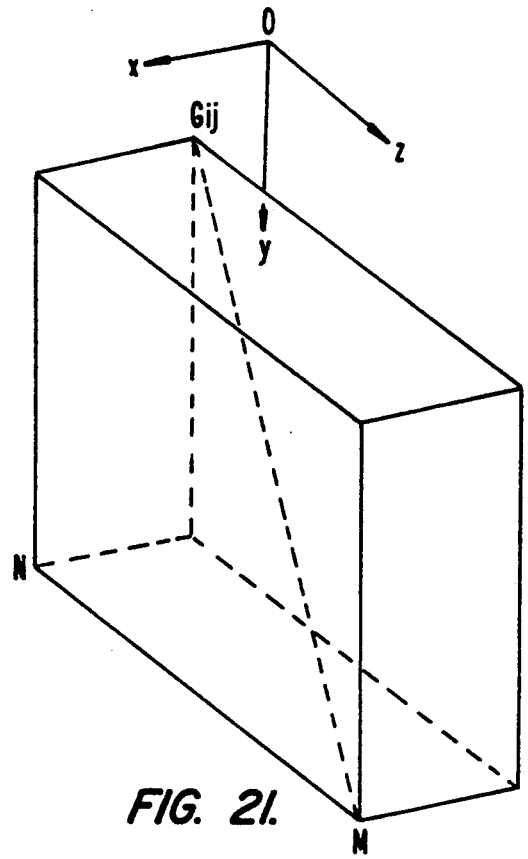
FIG. 21 shows the spatial relation between a target and a grid point on the windshield.

For every grid point on the windshield, we compute a set of direction numbers for the line connecting the grid point and the target. The set of direction numbers is normalized so that its z-member is 1. The x- and y-members of the set of direction numbers are stored in the $gd_x$ and $gd_y$ array, respectively. For example, refer to FIG. 21. Point M is the target. Its x,y,z-coordinates are $M_x$, $M_y$, and $M_z$, respectively. Point $G_{ij}$ represents a grid point where the i-th horizontal grid line on the windshield crosses the j-th "vertical" grid line on the windshield. The x,y,z-coordinates of point $G_{ij}$ are $g_x[j]$, $g_y[i]$, and $g_z[i][j]$, respectively. $M_x-g_x[j]$, $M_y-g_y[i]$, and $M_z-g_z[i][j]$ is a set of direction numbers for line $G_{ij}M$. Dividing all members in the set by the z-member, we get a set of direction numbers in which the z-member is 1, namely, $(M_x-g_x[j])/(M_z-g_z[i][j])$, $(M_y-g_y[i])/(M_z-g_z[i][j])$, and 1. The x-member of the set, $(M_x-g_x[j])/(M_z-g_z[i][j])$, is stored in $gd_x[i][j]$; and the y-member, $(M_y-g_y[i])/(M_z-g_z[i][j])$, is stored in $gd_y[i][j]$. Note that the x-member in this set may also be regarded as the slope ($\Delta x/\Delta z$) of the projection of line $G_{ij}M$ on the x-z plane, and the y-member the slope ($\Delta y/\Delta z$) of the projection of line $G_{ij}M$ on the y-z plane. The values stored in the $gd_x$ and $gd_y$ arrays are therefore called hereinafter in this example as the slope values.

When the Power switch 41 is just turned on, the 'normalMode' flag is initially set to true, and the AutoVisor2 procedure is invoked. Like in the embodiment of Example 1, this flag is set to false after switch 44 is pressed, and it is reset to true after switch 42 or 43 is pressed. The slope values are updated every time when the Power switch 41 is turned on, or the switches 42 or 43 are pressed. When the Power switch is turned off, all liquid crystal cells are turned transparent. Unlike the AutoVisor procedure in Example 1, which has to move the sunshade back to the home position when the power is turned off, the AutoVisor2 procedure simply stops operation immediately.

Operation of AutoVisor2

Figure 26:
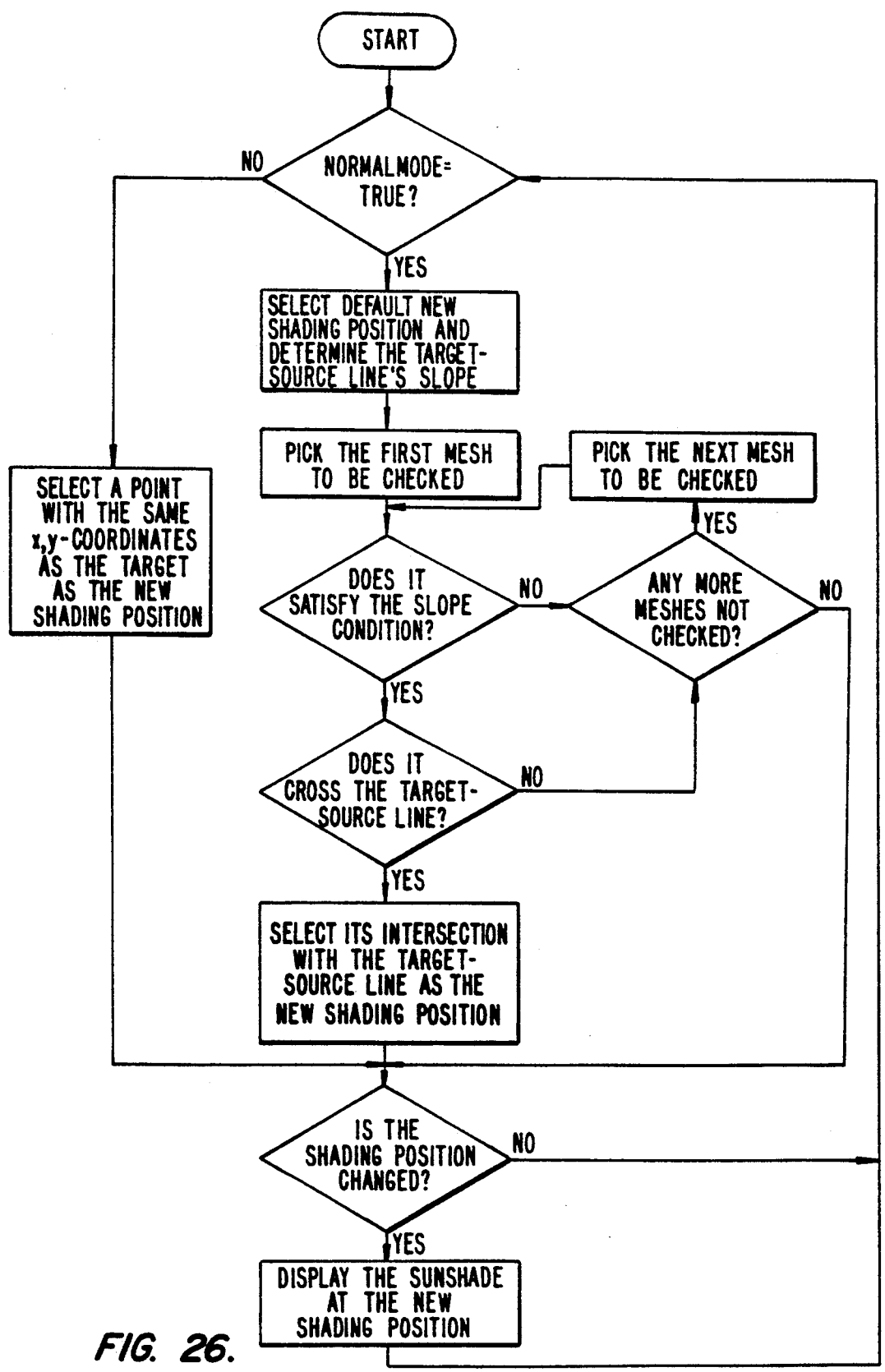
FIG. 26 is the flowchart of the Auto Visor2 procedure.

FIG. 25 is an example listing of the AutoVisor2 procedure used in this embodiment. FIG. 26 is its flowchart. Once invoked, the AutoVisor2 procedure repeats a loop of operations until the power is turned off. What it does in each loop depends on the value of the 'normalMode' flag.

When 'normalMode' is true, AutoVisor2 operates in the "normal" mode. Refer to FIG. 20. Point S represents the sun. Point m is the optical center of the lens of the source-tracking means. Point q is the point of incidence of the beam of sunlight passing through the lens. Line mq is the reference line. In this mode, AutoVisor2 first calls the GetPointOfIncid procedure to get the u,v-coordinates of the point q. These coordinates are converted to the x'-y'-z' coordinate system with formulae (2.12), (2.13) and (2.14). Recall that the x, y, and z axes are parallel to the x', y', and z' axes, and the x',y',z'-coordinates for point m are (0, 0,-m). (cf. Table 2.1). The slope values of the projections of line mq on the x-z plane and the y-z plane are $$d_x = \Delta x/\Delta z = q_{x'}/(q_{z'}+m) \qquad (2.15)$$

$$d_y = \Delta y/\Delta z = q_{y'}/(q_{z'}+m) \qquad (2.16)$$

For any mesh on the windshield, if $d_x$ is within the range of the $gd_x$ values of the four grid points of the mesh, and $d_y$ is within the range of the $gd_y$ values of these four grid points, it is possible for the target-source line, which is the line connecting the target and the source, to intersect with this mesh. So AutoVisor2 uses this "slope condition" to check through every mesh on the windshield to see which mesh is possible to intersect with the target-source line. (The Min4 and Max4 functions used in AutoVisor2 return the minimum and maximum, respectively, among the four given arguments.)

For any mesh that satisfies this condition, AutoVisor2 computes the coordinates of the point where mesh intersects with the target-source line, to see if the point of intersection is indeed inside the mesh. The computation is described below.

Figure 22:
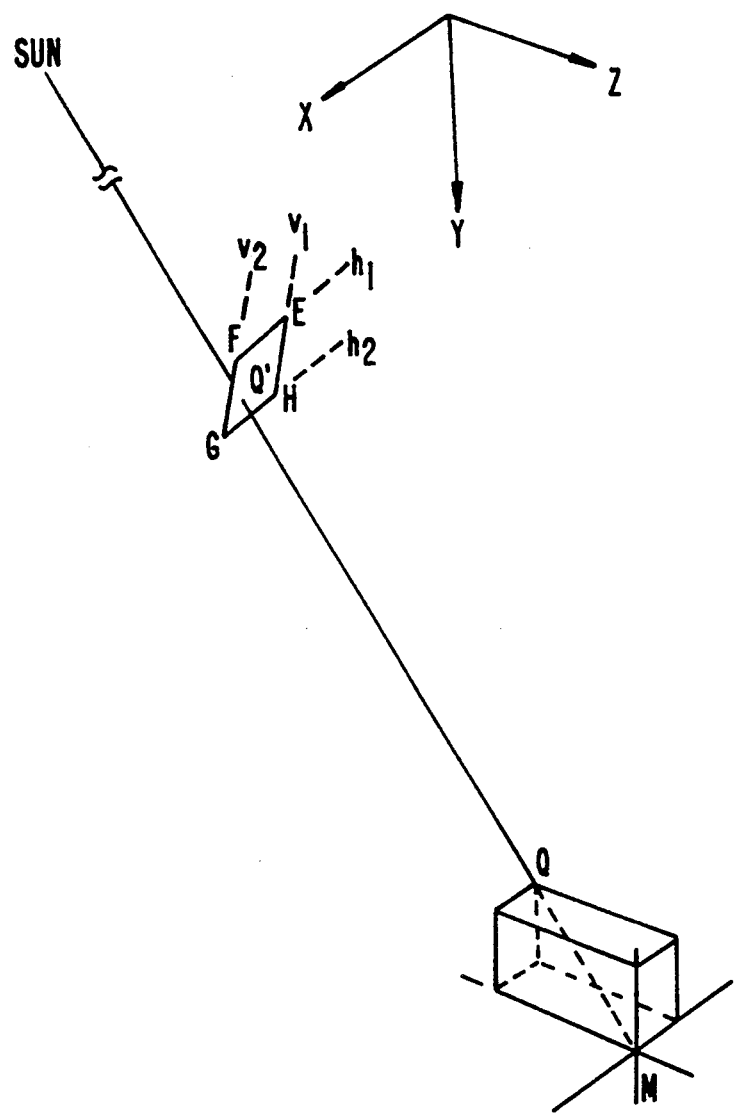
FIG. 22 shows the spatial relation between a target and a mesh on the windshield.

Refer to FIG. 22. Point M is the target. Its x,y,z-coordinates are ($M_x$, $M_y$, $M_z$). Line QM is the target-source line. Every point on this line can be expressed as $$M - t(d_x i + d_y j + k), \quad (2.17)$$

where i, j, and k are the unit vectors in the x, y, and z directions. Suppose EFGH is a mesh on the windshield which satisfies the "slope condition" described previously, and the x,y,z-coordinates for the four grid points of the mesh, E, F, G, and H, are $(E_x, E_y, E_z)$, $(F_x, F_y, F_z)$, $(G_x, G_y, G_z)$, and $(H_x, H_y, H_z)$, respectively. If the windshield area enclosed by the mesh is flat, then every point on this plane can be expressed as $$H + r(G-H) + s(E-H) \quad (2.18)$$

At the shading position Q', where line QM intersects with this plane, we have $$M - t(d_x i + d_y j + k) = H + r(G-H) + s(E-H), \text{ or}$$

$$rR + sS + tT = P, \quad (2.19)$$

where $R = G - H$, $S = E - H$, $T = d_x i + d_y j + k$, and $P = M - H$.

Let the x,y,z-components of R, S, T, and P be $(R_x, R_y, R_z)$, $(S_x, S_y, S_z)$, $(T_x, T_y, T_z)$, and $(P_x, P_y, P_z)$, respectively. Solving equation (2.19), we get $$r = (P_x S_y T_z + P_y S_z T_x + P_z S_x T_y - P_x S_z T_y - P_y S_x T_z - P_z S_y T_x)/\text{det}, \quad (2.20)$$

$$s = (R_x P_y T_z + R_y P_z T_x + R_z P_x T_y - R_x P_z T_y - R_y P_x T_z - R_z P_y T_x)/\text{det, and} \quad (2.21)$$

$$t = (R_x S_y P_z + R_y S_z P_x + R_z S_x P_y - R_x S_z P_y - R_y S_x P_z - R_z S_y P_x)/\text{det}, \quad (2.22)$$

where $$\text{det} = R_x S_y T_z + R_y S_z T_x + R_z S_x T_y - R_x S_z T_y - R_y S_x T_z - R_z S_y T_x. \quad (2.23)$$

If the values for both r and s are within 0 and 1, the intersection is indeed inside the mesh. If so, AutoVisor2 computes the x,y-coordinates of the shading position Q' with (2.17) and calls the MoveVisor2 procedure to move the sunshade to the shading position. Otherwise, if either r or s are negative or greater than 1, the intersection is outside the mesh, so AutoVisor2 goes on to look for the next possible mesh and do the same as above until a mesh is found to be intersecting with the target-source line or that all the meshes have been checked.

If 'normalMode' is false, AutoVisor2 operates in the "$M_x$-$M_y$ setting" mode, in which it calls the MoveVisor2 procedure to move the sunshade to a point on the windshield where the x,y-coordinates are $M_x$ and $M_y$, respectively. If the sunshade is moved to a position straight in front of, and at the same height as, the eyepoint, the values of $M_x$ and $M_y$ should be the same as the x- and y-coordinates of the eyepoint.

Note that there are times when the location of the sun from the perspective of the source-tracking means does not change very much. Thus it may save some processing time, if the AutoVisor2 procedure can be modified so that it memorizes the previous intersecting mesh. In every loop of operation, it first checks if the direction of the sun has changed. If so, it checks the previous intersecting mesh to find the new shading position. If the shading position is not within this mesh, it checks the adjacent meshes, and so on. Clearly, a person skilled in the art may provide algorithms for optimal performance under various conditions.

Advantages over EXAMPLE 1

This embodiment is preferred to the one in Example 1 for quite a few reasons. The major advantages are listed below:

(1) It does not employ any mechanical moving parts. Therefore it is safer, easier to maintain, and more responsive.

(2) It does not require exact orientation of the source-tracking means, making it easier to install.

(3) It does not have to stop operation when the windshield wiper is turned on, because it does not interfere with the windshield wiper.

(4) When the power is turned off, it does not have to move the windshield back to the home position. It simply turns all liquid crystal cells on the windshield to be transparent.

(5) It can easily be modified to block multiple light sources against the same eyepoint using multiple shading elements without adding any physical parts. This is useful because occasionally in addition to the light coming directly from the sun, there may be bright reflections of sunshine from the neighboring vehicles and buildings that we would like to be blocked, too.

For example, to work for multiple sources, the GetPointOfIncid procedure can be modified to return an array of the coordinates of the points of incidence of the beams from multiple sources; the AutoVisor2 procedure can be modified to compute the shading position from everyone of these points of incidence; and the MoveVisor2 procedure can be modified to accept an array of the coordinates of these shading positions.

(6) To shade the eyepoints for multiple occupants in the vehicle, it does not require so many additional physical parts, as described in Example 3 below.

EXAMPLE 3

An embodiment of the invention similar to what is described in Examples 1 and 2 can be modified to include an extra sunshade for the front passenger. This embodiment may be considered as two sunshade systems of the invention sharing most parts of the systems. If the sunshades are formed by liquid crystal cells as in Example 2, then even the means for positioning the sunshade is shared by both systems. The driver and the front passenger's eyepoints can be separately determined, and the corresponding targets updated, using the same calibrating means. The control panel in this embodiment may have an extra switch to choose whose eyepoint to be determined. After moving the targets to coincide with the corresponding eyepoints, this embodiment of dual system of the invention can continuously shade both persons' eyepoints from direct sunlight.

EXAMPLE 4

A number of the sunshade systems similar to those described in Examples 1 and 2 can be installed on multiple places on the same vehicle, such as the sun roof, the side or rear windows, etc. Some parts of the systems may be shared by all.

EXAMPLE 5

An embodiment of the invention similar to those described previously comprises a different kind of source-tracking means. Instead of a line-finding means having a two-dimensional CCD, the source-tracking means comprises two plane-finding means. In this embodiment, each plane-finding means comprises a one-dimensional CCD. There is a narrow slit and a lens in front of each CCD. One of the two plane-finding means has a vertical slit and a horizontal array of photon sensitive sites, while the other plan-finding means has a horizontal slit and a vertical array of photon sensitive sites. For each plane-finding means, the sunlight passing through the slit is focused by the lens to strike at a small segment on the array of photon sensitive sites, so that the center of the segment and the slit determine a reference plane containing the sun or a point sufficiently close to the sun for our purposes. The two reference planes intersect on a reference line. The shading position is determined by finding the intersection of the shading surface with the target-source line, which contains the target and is parallel to the reference line.

EXAMPLE 6

We use FIG. 2 again to show the internal view of an automobile installed with a less preferred but practical embodiment of the invention as a sunshade system. We use an x-y-z coordinate system similar to the one used in Example 1, where the x axis points to the left of the vehicle, the z axis points backwards, and the y axis points down. The shading element comprises a solid sunshade 9 confined to move along a track 10 mounted near the top edge of the windshield 8. The sunshade may be opaque or partially transparent. It may be moved with a conventional driving mechanism, such as one with an electric motor which pulls a cable connected to the sunshade. Again, we choose the middle point between the driver's eyes as the eyepoint 14. If we move the sunshade along the track from one end to the other, the trace of its center point 11 forms a curve, which is called the shading curve 15 hereinafter in this example for simplicity of description.

Since the sunshade does not move in the vertical direction, it is longer in the vertical direction; so that when it is positioned in a certain azimuth direction relative to the driver, it may block the sun in different elevations. However, the sunshade is significantly narrower in the horizontal direction but still wide enough for its umbra to cover both the driver's eyes, even when the sunshade is moved to the left or right end of the windshield. Alternatively, the sunshade may comprise extensions on its left and right sides so that its overall size in the horizontal direction is automatically controlled by the microprocessor to vary depending on its distance from the eyes. When the sunshade is directly in front of the driver, it is the narrowest, and when it is moved away from the driver, it is wider. The farther away, the wider it is, so that its umbra is always narrow but wide enough to cast a shadow covering both eyes.

The repositioning means in this embodiment is similar to what is described in Examples 1 and 2, but it ignores the y-coordinate in its computation. It considers all objects, including the sun, the eyepoint, the shading curve, the reference plane, etc., in terms of their projections on the base plane where the y-coordinate is zero.

Refer to FIG. 3. The source-tracking means comprises a plane-finding means, which comprises a one-dimensional CCD 35 enclosed in a box 20. The collection of the one-dimensional array of photon sensitive sites in the CCD is called hereafter in this example the sensing line 23. The source-tracking means is mounted on the vehicle so that the sensing line is parallel to the x axis. Otherwise a method similar to what's described in Example 2 would be necessary to determine its orientation. There is a lens 32 and a vertical slit 34 in front of the CCD, so that the sunlight is focused on a small segment on the sensing line. The center point of the segment is called the point of incidence. The coordinates of the point of incidence can be obtained in a way similar to what is described in Examples 1 and 2. The location of the point of incidence and the known location of the slit determines the reference plane 22 containing the sun 19 or some point close enough to the sun for our purposes. The projection of the reference plane on the base plane forms a reference line containing the projection of the sun or a point near the projection of the sun on the base plane.

The calibrating means in this embodiment is also similar to what is described in Examples 1 and 2, but it only determines the coordinates of the eyepoint and updates those of the target in two dimensions. More specifically, the x- and z-coordinates of the eyepoint is determined, but not the y-coordinate. If the driver moves her seat forward or backwards, or even sideways, the calibrating means can be used to determine the new x-and/or z-coordinates of the eyepoint. But if she adjusts her seat up or down, she does not use the calibrating means to determine the new y-coordinate of the eyepoint, because the vertical dimension is ignored by the repositioning means in this embodiment.

The microprocessor computes the x,z-coordinates of the shading position where the projection of the shading curve on the base plane intersects with the target-source line, which is the line containing the projection of the target on the base plane and parallel to the reference line. The microprocessor then sends appropriate driving signals to the motor to move the sunshade along the track to a place where the center of the sunshade has the same x,z-coordinates as the shading position.

EXAMPLE 7

This embodiment of the invention is installed on an automobile to reduce or eliminate the headlight glare from on-coming cars at night. This embodiment is similar to what is described in Example 2. The differences will be pointed out in the description that follows.

The first difference is that a different filter and a threshold value different from that used in Example 2 are used to find the excited photon sensitive sites in the CCD, because the intensity of the headlight is not so strong as the sun.

The second difference is that, instead of only one line-finding means, the source-tracking means in this embodiment comprises two line-finding means, each having a two-dimensional CCD behind a lens. We use two line-finding means because one line-finding means does not provide sufficient information to determine the target-source line. The headlight of an on-coming car may come so close that the reference line is not parallel to the target-source line. Each of the two line-finding means provides information for determining a reference line containing the center of the headlight. The two reference lines determine the location of the headlight, which is located at the intersection of the two reference lines. The target-source line can then be determined from the locations of the headlight and the target. The shading position is the intersection of the shading surface with the target-source line.

The two line-finding means can be installed in appropriate places on the vehicle where the rays from the headlight to them is not obstructed. The two line-finding means are preferably separated as far as possible in order to provide more accurate results. For example, one of the line-finding means may be installed on the left side of the vehicle on the dash board behind the windshield, while the other may be installed close to the ceiling on the right side of the vehicle behind the windshield.

The third difference is that, also due to the proximity of the headlight to the vehicle, the two beams of light from a headlight to the driver's two eyes are not parallel; therefore it is necessary to separately compute the shading positions for the two eyes. Thus two targets are used in this embodiment. Each target is caused to coincide with one of the eyes by a calibrating means similar to that described in Example 2.

The shading element in this embodiment is essentially the same as that in Example 2. That is, a two dimensional array of liquid crystal cells are built on the windshield, and the shading element is formed by selectively turning some of the cells to be less transparent, such as what is shown in FIG. 17. In this embodiment, however, we may want to reduce the size of the round areas 52 and 62. Note also that the distance between the two centers (50 and 60) may vary depending on the location of the headlight, because the eye-source lines from a headlight to the two eyes are not parallel when the headlight is close.

The fourth difference is that this embodiment must deal with multiple sources, because there usually are multiple headlights in sight. A conventional pattern recognition technique may be used to match and correspond the headlights' images in the two CCD's. For each eye we need to have as many shading element as there are headlights in sight.

Although the present invention has been disclosed and illustrated with particular embodiments in detail, it is to be clearly understood that the same is made herein by way of illustration and example only, and is not to be taken by way of limitation. The spirit and scope of the present invention are to be limited only by the terms of the appended claims.

What is claimed is:

1. A method for continuously repositioning a shading element to shade an eyepoint from the direct rays originated from a source of radiation; said method comprising the steps of:
   (a) finding a first geometric entity containing said eyepoint;
   (b) finding a second geometric entity containing said eyepoint, preferably the intersection of said two geometric entities is a point in space;
   (c) finding a point in said intersection; and
   (d) continuously repositioning said shading element to shade said point in said intersection from said direct rays.

2. The method of claim 1 for use with a repositioning means, said repositioning means continuously repositioning said shading element to shade a designated location from said direct rays during said steps (b) and (d), said designated location being referred hereinafter as the target; wherein
   said second geometric entity is the line connecting said eyepoint and said source at a certain location;
   said step (b) is accomplished when said source is located at said certain location by moving said target until said shading element is repositioned so as to shade said eyepoint from said direct rays; and
   said step (d) is accomplished by moving said target to said point in said intersection.

3. The method of claim 2 wherein
   the movement of said target during said step (b) is constrained on said first geometric entity; and
   said intersection only contains one point in space;
   so that said method appears to comprise only two explicit steps, namely, said steps (a) and (b).

4. The method of claim 2 wherein
   said repositioning means continuously repositions said shading element to shade said target from said direct rays during said step (a);
   said first geometric entity is the line connecting said eyepoint and said source at a certain other location; and
   said step (a) is accomplished when said source is located at said certain other location by moving said target until said shading element is repositioned so as to shade said eyepoint from said direct rays.

5. The method of claim 2 wherein
   said repositioning means continuously repositions said shading element in a predetermined direction relative to said target during said step (a);
   said first geometric entity is the line containing said eyepoint and parallel to said predetermined direction; and
   said step (a) is accomplished by moving said target until said shading element is repositioned in said predetermined direction relative to said eyepoint.

6. The method of claim 5 wherein
   a three dimensional Cartesian coordinate system is used, in which a selected axis is parallel to said predetermined direction and perpendicular to the other axes; and
   during said step (b), said target's coordinates on said other axes remain unchanged; so that:
   during said step (a), said shading element is continuously repositioned by said repositioning means at a position of which the coordinates on said other axes are the same as those of said target;
   at the end of said step (a), said target's coordinates on said other axes are the same as those of said eyepoint;
   at the end of said step (b), said target's coordinate on said selected axis is also the same as that of said eyepoint; and
   said method appears to comprise only two explicit steps.

7. The method of claim 5 wherein
   a two dimensional Cartesian coordinate system is used, in which a selected axis is parallel to said predetermined direction and perpendicular to the other axis; and
   during said step (b), said target's coordinate on said other axis remains unchanged; so that:
   during said step (a), said shading element is continuously repositioned by said repositioning means at a position of which the coordinate on said other axis is the same as that of said target;
   at the end of said step (a), said target's coordinate on said other axis is the same as that of said eyepoint;
   at the end of said step (b), said target's coordinate on said selected axis is also the same as that of said eyepoint; and
   said method appears to comprise only two explicit steps.

8. A device for continuously repositioning a shading object to shade a designated location from the direct radiation originated from an origin, said device comprising
- (a) means for positioning said shading object;
- (b) a tracking means comprising
  a plurality of sites responsive to said radiation; and
  means for causing uneven distribution of said radiation over said sites;
- (c) means in an electric network with said means for positioning said shading object and said tracking means, for
  selecting a shading position between said designated location and said origin in accordance with said designated location, said distribution, and the geometric configuration of said tracking means; so that said shading object positioned at said shading position will shade said designated location from said direct radiation; and
  producing signals for said means for positioning said shading object to position said shading object at said shading position.

9. The device of claim 8 wherein said means for causing uneven distribution comprises means for forming on said sites the image of said origin from at least one perspective.

10. A device for continuously repositioning a shading object to shade a designated location from the direct radiation originated from an origin, said device comprising
- (a) means for positioning said shading object;
- (b) means for providing spatial information sufficient for determining the location of said origin; and
- (c) means in an electric network with said means for positioning said shading object and said means for providing spatial information, for
  determining the location of said origin in accordance with said spatial information;
  selecting a shading position between said designated location and the determined location of said origin, so that said shading object positioned at said shading position will shade said designated location from said direct radiation; and
  producing signals for said means for positioning said shading object to position said shading object at said shading position.

11. The device of claim 10 wherein said means for providing spatial information comprises means for capturing the images of said origin from a plurality of perspectives.

12. A device for continuously repositioning a shading element to shade an eyepoint from the direct rays originated from a source, said device comprising:
- (a) said shading element;
- (b) a holding means for holding electrical values representing a location, said represented location being referred hereinafter as the target; said values being referenced by the repositioning means in (c) and changeable by the calibrating means in (d);
- (c) a repositioning means for continuously repositioning said shading element to shade said target from said direct rays; and
- (d) a calibrating means in an electrical circuit with said holding means and said repositioning means, for determining the location of said eyepoint and changing said values to represent the determined location of said eyepoint.

13. The device of claim 12 wherein
said repositioning means comprises the device of claim 8 or 10;
said shading element is said shading object;
said values represent said designated location;
said source is said origin; and
said circuit comprises said network.

14. The device of claim 12 wherein said calibrating means comprises
means for changing said values whereby the line connecting said eyepoint and said source may be found by changing said values so that said shading element is repositioned by said repositioning means accordingly to shade said eyepoint from said direct rays; and
means for
finding the intersection of two lines, the first of said two lines being one that connects said eyepoint and a first location of said source, and the second of said two lines being one that connects said eyepoint and a second location of said source; and
changing said values to represent said intersection.

15. The device of claim 12 wherein said calibrating means comprises
means for changing said values so that said shading element may be repositioned by said repositioning means accordingly to shade said eyepoint from said direct rays when said source is located at a first location; and
means for changing said values in such a way that said target always remains in line with said eyepoint and said first location of said source, so that said shading element may be repositioned by said repositioning means accordingly to shade said eyepoint from said direct rays when said source is located at a second location.

16. The device of claim 12 wherein said calibrating means comprises
means for changing said values and enforcing said repositioning means to continuously reposition said shading element in a predetermined direction relative to said target, so that said shading element may be repositioned by said repositioning means accordingly in a predetermined direction relative to said eyepoint; and
means for releasing said enforcement on said repositioning means and changing said values in such a way that said target only moves in a direction parallel to said predetermined direction, so that said shading element may be repositioned by said repositioning means accordingly to shade said eyepoint from said direct rays.

17. The device of claim 16 wherein
said device uses a three dimensional Cartesian coordinate system in which a selected axis is parallel to said predetermined direction and perpendicular to the other axes;
said shading element is movable on a two dimensional surface between said source and said eyepoint;
said values represent the coordinates of said target in said coordinate system;
said means for changing said values and enforcing said repositioning means only changes said target's coordinates on said other axes, leaving said target's coordinate on said selected axis unchanged; and
said means for releasing said enforcement and changing said values only changes said target's coordinate on said selected axis, leaving said target's coordinates on said other axes unchanged.

18. The device of claim 16 wherein said device uses a two dimensional Cartesian coordinate system in which a selected axis is parallel to said predetermined direction and perpendicular to the other axis;

said shading element is movable along a one dimensional curve between said source and said eyepoint;

said values represent the coordinates of said target in said coordinate system;

said means for changing said values and enforcing said repositioning means only changes said target's coordinate on said other axis, leaving said target's coordinate on said selected axis unchanged; and said means for releasing said enforcement and changing said values only changes said target's coordinate on said selected axis, leaving said target's coordinate on said other axis unchanged.

19. The device of claim 12 wherein said calibrating means comprises
means for generating and receiving periodic waves for determining the location of said eyepoint, and
means for changing said values to represent the determined location of said eyepoint.

20. The device of claim 12 wherein said calibrating means comprises
means for continuously determining the current location of said eyepoint and means for continuously changing said values to represent said current location.

21. The device of claim 8, 10, or 12, comprising
a plurality of cells, the transmittance of said radiation or rays through said cells being selectively changeable; and
means for selectively reducing said transmittance through said cells;
so that said shading object or element comprises at least one cell through which said transmittance is reduced.

22. The device of claim 8, 10, or 12, wherein said shading object or element comprises a solid plate whereby the transmittance of said radiation or rays through said plate is reduced.

23. The device of claim 22 comprising
a rotatable joint;
at least one extender connected at one end to said rotatable joint and at the other end to said plate; and
means for controlling the length and rotation of said extender.

24. The device of claim 8, 10, or 12, comprising means for varying the size of said shading object or element in accordance with at least one of the following factors:
the distance from said shading object or element to said designated location or target,
the preferred size of the shadow of said shading object or element at said designated position or target, and
the precision of said device.

25. The device of claim 8, 10, or 12, comprising
means for saving the location of said designated location or target for later use and
means for restoring the location previously saved.

* * * * *